United States Patent
Mavani

(10) Patent No.: US 12,021,857 B2
(45) Date of Patent: *Jun. 25, 2024

(54) VOICE BIOMETRIC AUTHENTICATION IN A VIRTUAL ASSISTANT

(71) Applicant: Bank of America Corporation, Charlotte, NC (US)

(72) Inventor: Saurabh Mavani, Lake Hopatcong, NJ (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/122,069

(22) Filed: Mar. 15, 2023

(65) Prior Publication Data
US 2023/0216842 A1 Jul. 6, 2023

Related U.S. Application Data

(63) Continuation of application No. 16/938,018, filed on Jul. 24, 2020, now Pat. No. 11,665,153.

(51) Int. Cl.
*H04L 9/40* (2022.01)
*G06F 9/451* (2018.01)
*G06F 16/683* (2019.01)
*G10L 17/00* (2013.01)

(52) U.S. Cl.
CPC .......... *H04L 63/0823* (2013.01); *G06F 9/453* (2018.02); *G06F 16/683* (2019.01); *G10L 17/00* (2013.01); *H04L 63/0861* (2013.01)

(58) Field of Classification Search
CPC ... G06F 21/32; H04L 63/0861; H04W 12/065
See application file for complete search history.

(56) References Cited

U.S. PATENT DOCUMENTS

| 8,140,340 B2 | 3/2012 | Bhogal et al. |
| 10,013,983 B1* | 7/2018 | Johnson ................ G06V 40/16 |
| 2014/0172430 A1* | 6/2014 | Rutherford ............ G06F 3/167 |
| | | 704/273 |

(Continued)

OTHER PUBLICATIONS

Sep. 14, 2022 U.S. Non-Final Office Action U.S. Appl. No. 16/938,018.
Feb. 1, 2023—U.S. Notice of Allowance—U.S. Appl. No. 16/938,018.

*Primary Examiner* — Olugbenga O Idowu
(74) *Attorney, Agent, or Firm* — Banner & Witcoff, Ltd.

(57) ABSTRACT

Aspects of the disclosure relate to voice biometric authentication in a virtual assistant. In some embodiments, a computing platform may receive, from a user device, an audio file comprising a voice command to access information related to a user account. The computing platform may retrieve one or more voice biometric signatures from a voice biometric database associated with the user account, and apply a voice biometric matching algorithm to compare the voice command of the audio file to the one or more voice biometric signatures to determine if a match exists between the voice command and one of the one or more voice biometric signatures. In response to determining that a match exists, the computing platform may retrieve information associated with the user account, and then send, via the communication interface, the information associated with the user account to the user device.

19 Claims, 12 Drawing Sheets

(56) References Cited

U.S. PATENT DOCUMENTS

| | | |
|---|---|---|
| 2015/0088514 A1 | 3/2015 | Typrin |
| 2019/0050545 A1* | 2/2019 | Keret .................... G10L 17/24 |
| 2019/0243956 A1* | 8/2019 | Sheets .................... G06F 21/32 |

* cited by examiner

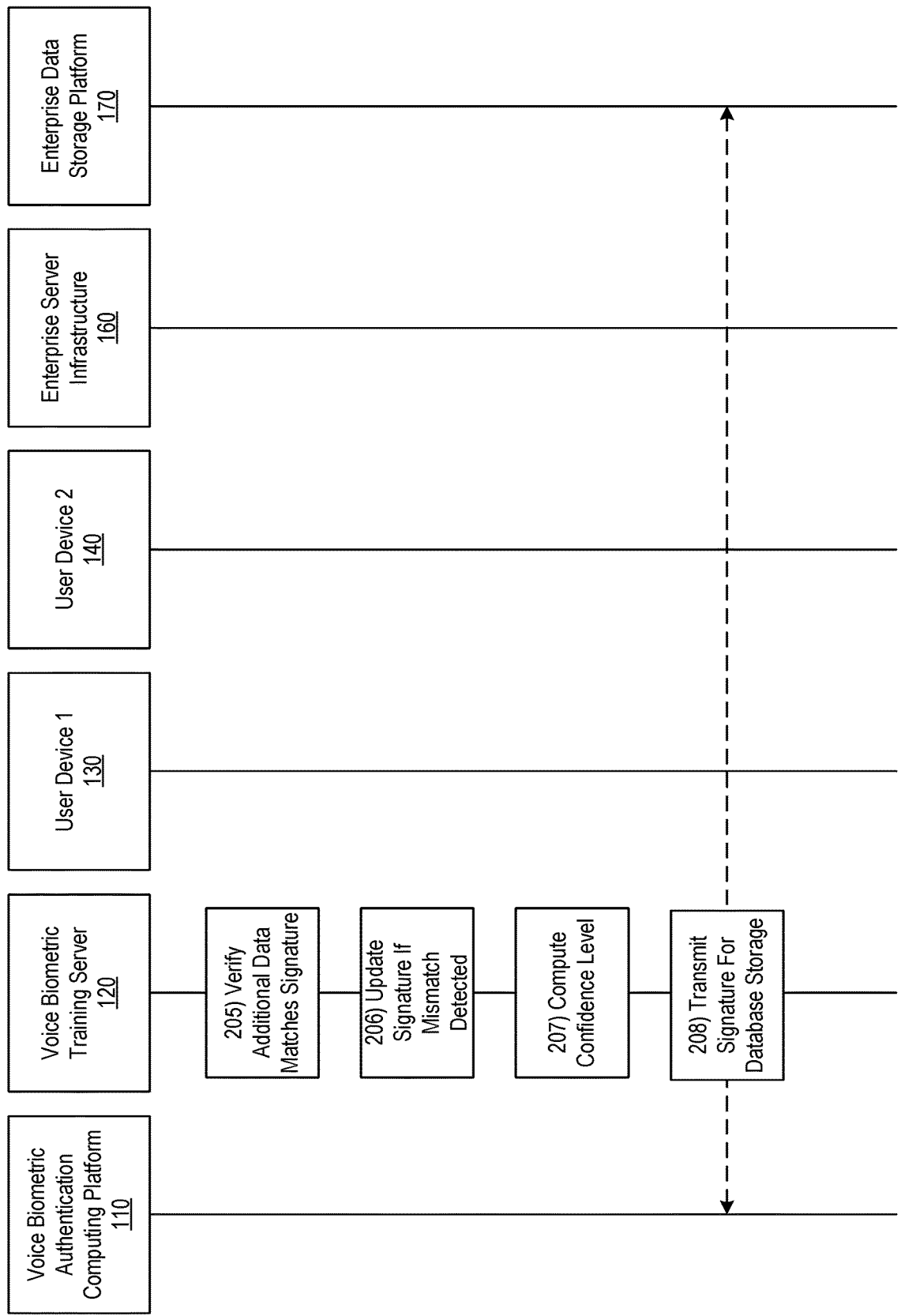

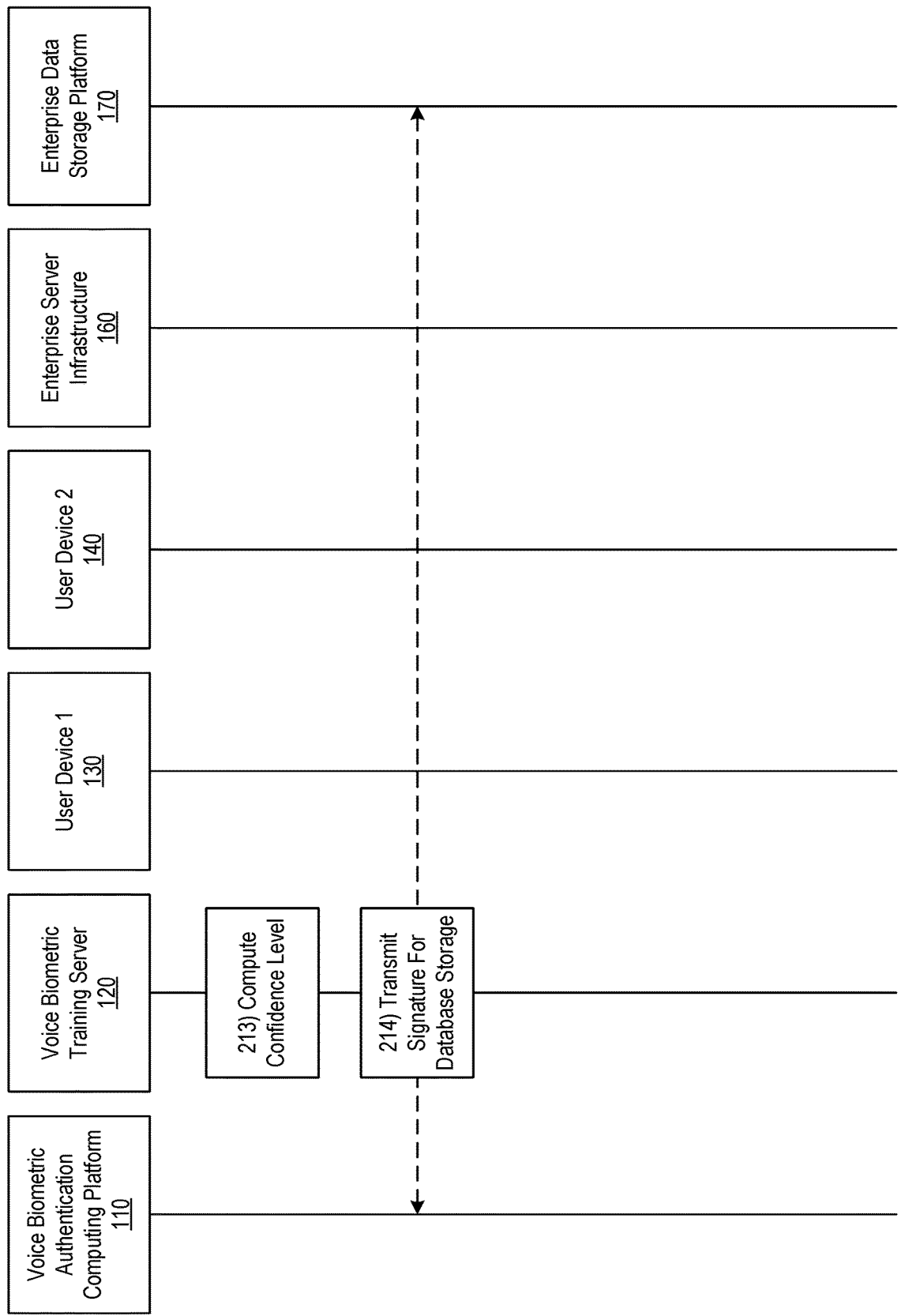

VOICE BIOMETRIC AUTHENTICATION IN A VIRTUAL ASSISTANT

CROSS REFERENCE TO RELATED APPLICATIONS

This application is a continuation of and claims priority to U.S. patent application Ser. No. 16/938,018, filed Jul. 24, 2020, and entitled "Voice Biometric Authentication in a Virtual Assistant," which is incorporated herein by reference in its entirety.

BACKGROUND

Enterprise organizations may utilize various computing infrastructures to maintain confidential information and/or other sensitive data that is created and/or used for various purposes. Ensuring that this data is secure and only accessible to appropriate users for appropriate purposes may be critically important to protecting the integrity and confidentiality of the underlying information and associated resources. This aim may be further complicated by the rise of interactive voice recognition (IVR) systems and other voice recognition technology, because of the possibility of unauthorized access to confidential information using voice commands. This is even more particularly an issue with regard to user devices equipped with virtual assistants that use voice recognition technology, as such user devices may frequently be subject to access by various different users.

SUMMARY

Aspects of the disclosure provide effective, efficient, scalable, and convenient technical solutions that address and overcome the technical problems associated with ensuring information security and preventing unauthorized access by using voice biometric authentication in user devices with virtual assistants.

In accordance with one or more embodiments, a computing platform having at least one processor, a communication interface, and memory that may receive, via the communication interface, from a user device, an audio file comprising a voice command to access information related to a user account. Subsequently, the computing platform may retrieve one or more voice biometric signatures from a voice biometric database associated with the user account. Based on applying a voice biometric matching algorithm to compare the voice command of the audio file to the one or more voice biometric signatures, the computing platform may determine if a match exists between the voice command and one of the one or more voice biometric signatures. In response to determining that a match exists between the voice command and one of the one or more voice biometric signatures, the computing platform may retrieve information associated with the user account. Thereafter, the computing platform may send, via the communication interface, the information associated with the user account to the user device.

In some embodiments, retrieving information associated with the user account may include transmitting a user identity verification to an enterprise server and retrieving the information associated with the user account from the enterprise server.

In some embodiments, in response to determining a mismatch between the voice command and one of the one or more voice biometric signatures, the computing platform may generate an error message to transmit to the user device, and the error message may comprise at least one of: an audio file, a video file, an image file, or text content.

In some embodiments, the computing platform may receive, from the user device, a second audio file comprising a second voice command to initiate a transaction related to the user account. Then, the computing platform may apply the voice biometric matching algorithm to compare the second voice command of the second audio file to the one or more voice biometric signatures to determine if a match exists between the second voice command and one of the one or more voice biometric signatures. In response to determining that a match exists between the second voice command and one of the one or more voice biometric signatures, the computing platform may transmit a notification comprising a transaction verification to an enterprise server.

In some embodiments, the computing platform may, in response to determining a mismatch between the voice command and the one or more voice biometric signatures, determine whether a level of background noise associated with the audio file is higher than a noise threshold. In response to determining that the level of background noise is higher than the noise threshold, the computing platform may generate a message to transmit to the user device, and the message may include an indication that the voice command was not verified and a request for a repeat voice command with a lower level of background noise. Thereafter, and upon sensing that a level of background noise at the user device is lower than the noise threshold, the computing platform may transmit a prompt to the user device to obtain the repeat voice command.

In some embodiments, the computing platform may, in response to determining a mismatch between the voice command and the one or more voice biometric signatures, determine if a match percentage is above a match threshold. Based on determining that the match percentage is above the match threshold, the computing platform may generate a message to transmit to the user device, and the message may comprise a request for a repeat voice command. The computing platform may, in response to determining that the match percentage is below match threshold, generate an alert comprising a notification of an unauthorized voice command attempt at the user device. Then, the computing platform may send, via the communication interface, the alert to an enterprise server.

In some embodiments, the computing platform may determine if a number of voice command attempts exceeds an attempt threshold. Upon determining that the number of voice command attempts exceeds the attempt threshold, the computing platform may generate an alert comprising a notification of unauthorized voice command attempts at the user device. Then, the computing platform may send, via the communication interface, the alert to an enterprise server. In some embodiments, upon determining that the number of voice command attempts exceeds the attempt threshold, the computing platform may send, via the communication interface, the alert to a second user device. The second user device may be a user account verified device, and the alert may comprise information related to the number of voice command attempts. In some embodiments, upon determining that the number of voice command attempts exceeds the attempt threshold, the computing platform may send, via the communication interface, a command to the user device to disable voice command functionality.

In some embodiments, at least one biometric signature of the one or more voice biometric signatures may be created by a voice biometric training computing platform based on passive voice monitoring audio data. In some embodiments, creating the at least one voice biometric signature by the voice biometric training computing platform based on passive voice monitoring audio data may include computing a confidence level associated with the at least one biometric signature. In some embodiments, creating the at least one voice biometric signature by the voice biometric training computing platform based on passive voice monitoring audio data may include updating an initially-created voice biometric signature based on additional received passive voice monitoring audio data.

In some embodiments, at least one biometric signature of the one or more voice biometric signatures may be created by a voice biometric training computing platform based on active voice monitoring data. In some embodiments, creating the at least one voice biometric signature by the voice biometric training computing platform based on active voice monitoring audio data may include sending a plurality of user voice commands to the user device, transmitting, from the user device to the voice biometric training computing platform, audio data responsive to each of the plurality of user voice commands, and computing the at least one voice biometric signature from the audio data responsive to each of the plurality of user voice commands.

In accordance with one or more embodiments, a method is provided at a computing platform comprising at least one processor, a communication interface, and memory. The method may include receiving, from a user device, an audio file comprising a voice command to access information related to a user account. One or more voice biometric signatures may be retrieved from a voice biometric database associated with the user account. A voice biometric matching algorithm may be applied to compare the voice command of the audio file to the one or more voice biometric signatures to determine if a match exists between the voice command and one of the one or more voice biometric signatures. In response to determining that a match exists between the voice command and one of the one or more voice biometric signatures, information associated with the user account may be retrieved. Thereafter the information associated with the user account may be sent, via the communication interface, to the user device.

In some embodiments, in response to determining a mismatch between the voice command and one of the one or more voice biometric signatures, the method may include generating an error message to transmit to the user device, and the error message may comprise at least one of: an audio file, a video file, an image file, or text content.

In accordance with one or more embodiments, one or more non-transitory computer-readable media may be provided storing instructions that, when executed by a computing platform comprising at least one processor, a communication interface, and memory cause the computing platform to receive, from a user device, an audio file comprising a voice command to access information related to a user account, retrieve one or more voice biometric signatures from a voice biometric database associated with the user account, apply a voice biometric matching algorithm to compare the voice command of the audio file to the one or more voice biometric signatures to determine if a match exists between the voice command and one of the one or more voice biometric signatures, in response to determining that a match exists between the voice command and one of the one or more voice biometric signatures, retrieve information associated with the user account, and send, via the communication interface, the information associated with the user account to the user device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2B depict an illustrative event sequence for a passive voice signature setup at a voice biometric training server in accordance with one or more example embodiments;

FIGS. 2C-2D depict an illustrative event sequence for an active voice signature setup at a voice biometric training server in accordance with one or more example embodiments;

DETAILED DESCRIPTION

Figure 1A:
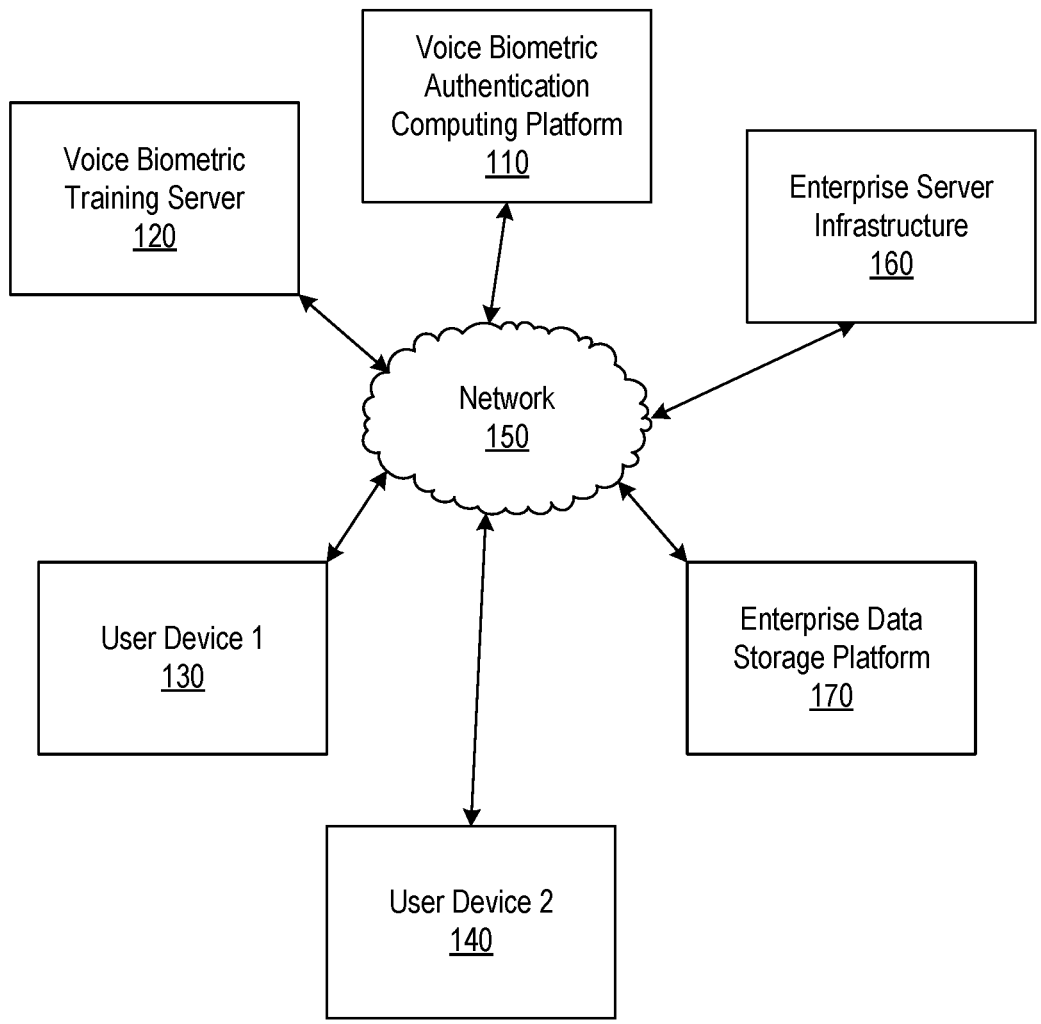
FIGS. 1A and 1B depict an illustrative computing environment for one or more devices using voice biometric authentication in a virtual assistant in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure describe a voice biometric authentication system that may be developed and deployed to safeguard confidential customer information accessible from a user device using a virtual assistant. Specifically, a voice biometric authentication system in a virtual assistant to authenticate voice commands relating to accessing user account information is described herein. The virtual assistant may carry out certain voice commands without voice authentication (e.g., voice commands unrelated to user account information) and may submit other commands through the voice biometric authentication system as a precursor to carry out such commands (e.g., voice commands to access information related to a user account). In some instances, the virtual assistant may directly respond to a user voice command with an audio response or audio-visual response, e.g., that indicates whether the voice biometric authentication system determined the voice command to be authorized by the user account. Additionally or alternatively, the virtual assistant may request additional voice commands from the user, depending on determinations made by the voice biometric authentication system in response to an initial voice command.

Voice activated systems may operate to provide users with various information. In many scenarios, the context of user requests may entail the disclosure of potentially confidential or private customer information (e.g., relating account information, credit card statements, account balances, or the like). According to aspects of the present disclosure, a voice biometric authentication system is employed with a user device equipped with an IVR-like virtual assistant. Confidential or protected information may be provided to the user device only upon authenticating a voice command to access such information. In short, such confidential information may be protected from being inadvertently provided to an unauthorized user, without adding undue difficulty to an authorized user is still being able to access the such information.

As an example, a banking institution may employ the approaches described below to authenticate a voice command requesting access to a bank account or other banking services, e.g., from a mobile device using a virtual assistant. Instead of prompting users for access credentials (e.g., an account number or an access identifier), the voice biometric authentication system may verify the identity of the user based on analysis of the voice command. The identity of a user issuing the voice command may be confirmed and authorized based on the voice command itself. Due to the ability to quickly authorize a voice command without necessarily requiring additional access credentials, a positive user experience may be provided. Additionally, preventing unauthorized users from accessing private of confidential information using voice commands, and in some cases preventing potentially fraudulent activity on a user account, further provides benefits to both account holders and enterprise organizations associated with the account. Other benefits and advantages will be appreciated with the benefit of the additional disclosures set forth below.

Figure 1B:
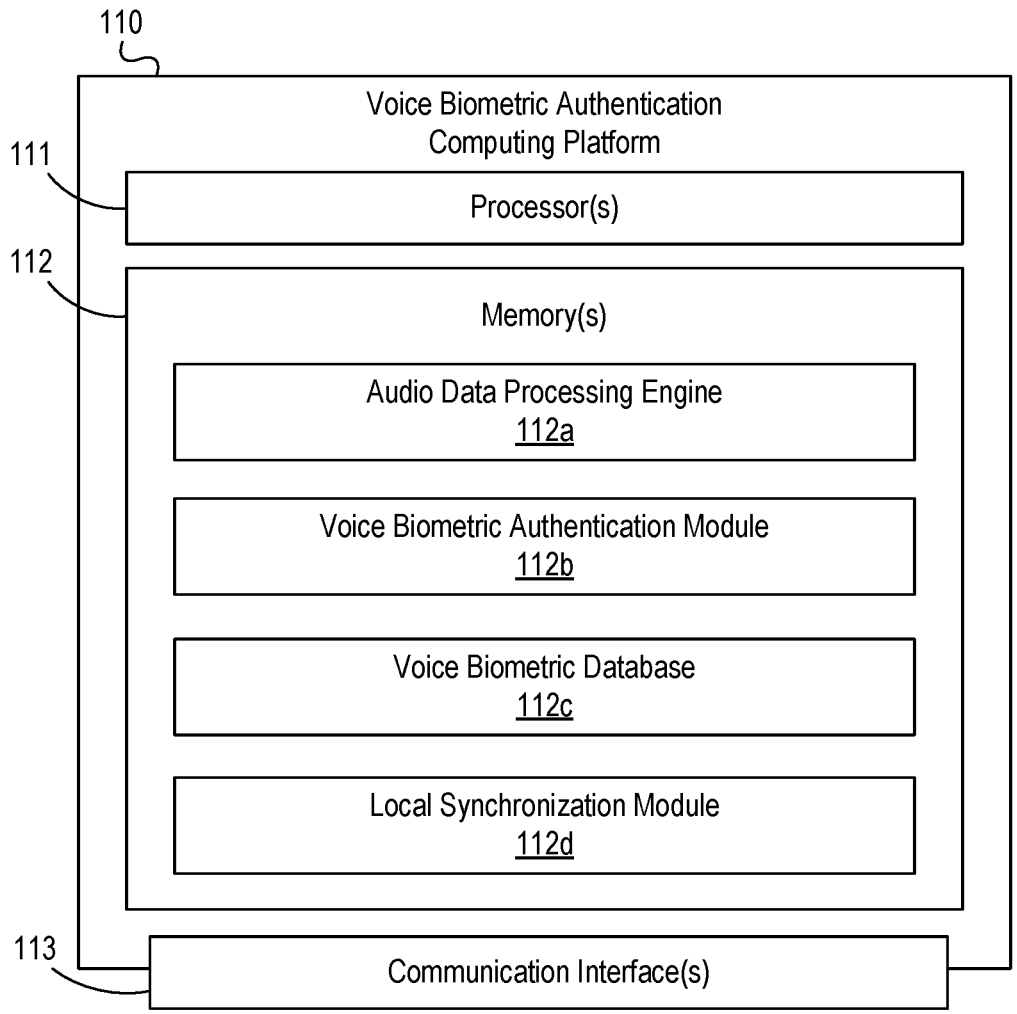

FIGS. 1A and 1B depict an illustrative computing environment for one or more devices using voice biometric authentication in a virtual assistant in accordance with one or more example embodiments. Referring to FIG. 1A, computing environment 100 may include one or more computer systems. For example, computing environment 100 may include a voice biometric authentication computing platform 110, a voice biometric training server 120, a first user device 130, a second user device 140, enterprise server infrastructure 160, and an enterprise data storage platform 170.

As illustrated in greater detail below, voice biometric authentication computing platform 110 may include one or more computing devices configured to perform one or more of the functions described herein. For example, voice biometric authentication computing platform 110 may include one or more computers (e.g., laptop computers, desktop computers, servers, server blades, or the like) and/or other computer components (e.g., processors, memories, communication interfaces) that may be used to host and maintain a voice-activated virtual assistant. In some instances, the voice biometric authentication computing platform 110 may be configured to train the virtual assistant using previous voice commands and/or interactive voice response sessions, to use the virtual assistant to verify of identity of an individual, to provide responses to the individual and/or to cause one or more events to be processed based on voice commands and/or verification of the identity of the individual associated with the voice command. In some instances, the voice biometric authentication computing platform 110 may be configured to dynamically update the virtual assistant as additional data and/or feedback is received.

In some cases, a virtual assistant associated with voice biometric authentication computing platform 110 may include functionality to facilitate user interaction via a user device to perform one or more desired activities, such as electronic transaction management activities (e.g., budgeting activities and the like) and performance and/or scheduling of one or more electronic transactions (e.g., scheduling a bill-pay transaction, initiating an electronic funds transfer, and the like). In some cases, the virtual assistant may interact with other networked computing systems managing and/or monitoring electronic transactions associated with the user. For example, the virtual assistant may access information from one or more online computing systems, such as recurring deposit electronic transactions from an electronic deposit computing system, bill-pay electronic transactions from a bill-pay computing system, and/or one or more customer preferences (e.g., budget information, minimum threshold information, and the like).

Voice biometric training server 120 may include one or more computing devices and/or other computer components (e.g., processors, memories, communication interfaces). In addition, and as illustrated in greater detail below, voice biometric training server 120 may be configured to receive information from, send information to, and/or otherwise exchange information with one or more devices described herein.

User device 130 may include one or more computing devices and/or other computer components (e.g., processors, memories, communication interfaces). In addition, and as illustrated in greater detail below, user device 130 may be configured to receive information from, send information to, and/or otherwise exchange information with one or more devices described herein. In some examples, user device 130 may be remote from voice biometric authentication computing platform 110 and/or voice biometric training server 120. User device 130 may be equipped with a virtual assistant and may, among other functions, be configured to receive audio files of voice commands and to transmit the audio files to other devices as described herein.

User device 140 may include one or more computing devices and/or other computer components (e.g., processors, memories, communication interfaces). In addition, and as illustrated in greater detail below, user device 140 may be configured to receive information from, send information to, and/or otherwise exchange information with one or more devices described herein. In some examples, user device 140 may be remote from voice biometric authentication computing platform 110 and/or voice biometric training server 120 and/or user device 130. User device 140 may be a user account verified device and may provide information related to unauthorized attempts to access the user account from another device.

User device 130 may be a mobile computing device (e.g., smartphone, tablet, smart watch, laptop computer, or the like) or desktop computing device (e.g., desktop computer, terminal, or the like) and/or may include a smart speaker or other related devices. In addition, user device 130 may be linked to and/or used by a first user (who may, e.g., be a customer of an enterprise organization (e.g., a financial institution) associated with enterprise server infrastructure 160 and enterprise data storage platform 170), but may also accessible to other users. User device 140 may be a mobile computing device (e.g., smartphone, tablet, smart watch, laptop computer, or the like) or desktop computing device (e.g., desktop computer, terminal, or the like). In addition, user device 140 may be linked to and/or used by the first user. User device 140 may, in some instances, not be accessible to other users or may be associated with a higher degree of user account security than user device 130. User device 130 and/or user device 140 may be used to interact with an account for an enterprise organization (e.g., an online banking account, or the like). In some instances, user device 130 and/or user device 140 may be configured to communicate with a virtual assistant host platform (e.g., voice biometric authentication computing platform 110 and/or voice biometric training server 120, or the like) to provide one or more virtual assistant services to the individual. In some instances, user device 130 and/or user device 140 may be configured to display one or more user interfaces (e.g., online banking interfaces, or the like) and/or provide one or more audio outputs.

In some cases, a virtual assistant may include functionality to facilitate user interaction via user device 130 to perform one or more desired activities, such as electronic transaction management activities (e.g., budgeting activities and the like) and performance and/or scheduling of one or more electronic transactions (e.g., scheduling a bill-pay transaction, initiating an electronic funds transfer, and the like). The virtual assistant may allow a user to quickly and easily access various types of account information, e.g., using voice commands. In some cases, the virtual assistant may be capable of authenticating a voice command via a voice biometric authentication system as described herein. This will safeguard against inadvertent or unauthorized disclosure of confidential or private account information while still allowing the authorized user be able to easily access account information. In some cases, the user may configure one or more setting of the virtual assistant related to the use of the voice biometric authentication system, such as what types of voice commands trigger a voice biometric authentication process or how sensitive the voice biometric authentication system is in triggering an unauthorized voice command alert. The may improve user experience in personalizing various aspects of the voice biometric authentication system.

In some cases, a virtual assistant service may interact with other networked computing systems managing and/or monitoring electronic transactions associated with the user. For example, the virtual assistant may interact with enterprise server infrastructure 160 and/or enterprise data storage platform 170 to retrieve information related to the enterprise user account, such as recurring electronic transactions from an electronic deposit computing system, bill-pay electronic transactions from a bill-pay computing system, and/or one or more customer preferences (e.g., budget information, minimum threshold information, and the like). In some examples, virtual assistant may interact with enterprise server infrastructure 160 to initiate one or more transactions related with the enterprise user account. The virtual assistant may cause display of a virtual assistant user interface screen on display screen of user device, e.g., in response to one or more user queries using the virtual assistant.

User device 130 may include one or more sensors for use in capturing or otherwise sensing biometric information of a user of user device 130. For example, user device 130 may include one or more sensors within the device and one or more sensors externally connected to user device 130, such as biometric sensors which may be communicatively coupled to user device 130 via an I/O port. User device 130 may further include one or more of an audio input (e.g., a microphone), a fingerprint sensor, a camera (e.g., a still camera, a video camera, an infrared/biometric camera, and the like), and/or a location sensor (e.g., a GPS device, a triangulation device such as a telecommunications modem, and the like). In some cases, user device 130 may be a stand-alone device dedicated to the function of receiving and responding to voice commands. In some cases, an application and/or an application programming interface (API) interfacing with an application may run on user device 130 (e.g., a mobile phone, a wearable device, a smartwatch, a laptop computer, a desktop computer, a tablet device, and the like). In some cases, user device 130 may be a stand-alone device, such as a self-service transaction device, a kiosk, or the like. In some cases, user device 130 may be an external hardware device that may plug into, or otherwise connect, with a personal computing device. For example, user device 130 may connect to a mobile phone or other such device via a hardwired connection (e.g., a universal serial bus (USB) connection, a mini-USB connection, and the like) or via a wireless connection (e.g., a Bluetooth connection, a WiFi, connection, a telecommunications network connection, an infrared (IR) communication link, and the like).

In some cases, an individual, may desire to use user device 130 (along with voice biometric training server 120) to generate a voice biometric signature that may be used for data security and/or authentication purposes, as will be described in more detail below. In some cases, the individual may desire to use a voice biometric signature to allow use of the added security that the voice biometric authentication system offers. In some cases, the individual may desire to use the voice biometric signature to avoid a possibility of an improper impersonation by an unauthorized user at the expense of the individual's credentials. In that regard, the user's voice signal may be combined with additional information that may be incorporated into the voice biometric signature, and/or applied as an overlay over the user's voice signal as, for an example, a "digital watermark." In doing so, the voice biometric authentication system may further reduce the likelihood of an unauthorized user attempting to mimic or use a voice recording in an attempt to access information of another user's account.

In some cases, the user's voice signal may be captured using an audio input of user device 130 and the user's voice signal may comprise a voice command spoken by the user, such as a particular word or phrase. In some examples, user device 130 may capture a geographic location using a location sensor to identify a current location of user device 130, e.g., where user device 130 is a mobile device. Additionally, user device 130 may capture additional biometric information using one or more biometric sensors, such as a fingerprint sensor, a camera, and/or other such sensors that may be capable of capturing biometric information. In some cases, the biometric information captured may be used in a user authentication procedure for allowing the user access to user device 130. For example, user device 130 may capture fingerprint information, retina scan information, facial recognition information with or without text information, or other user verification and/or passwords to facilitate user logon to the user device 130 and/or an application running on user device 130. Once the user login has been verified, the user may be allowed access to one or more features and/or functionality of user device 130, including creation and/or use of a voice biometric signature. In some cases, user device 130 may be configured to incorporate additional information into the user's voice signal to generate a unique voice biometric signature for the user.

User device 130 may include a mobile portal or online portal that provides access to an enterprise organization system (e.g., via enterprise server infrastructure 160) by a communication session with user device 130. Communications used to access to the enterprise organization through the mobile portal may be referred to as mobile communications. In some examples, mobile communications may include HyperText Transfer Protocol (HTTP) requests. The mobile portal may provide access to enterprise organizations via a mobile application (which may be referred to as a "mobile app" or "app") installed on user device 130, which may be a mobile computing device, e.g., a smartphone, a palmtop computer, a tablet computer, and other types of mobile computing devices configured to run mobile applications. A mobile application may thus be in communication with the mobile portal through one or more wireless networks (e.g., a cellular network), wired networks (e.g., the Internet), or a combination of wired or wireless networks.

An online portal may also provide access to the enterprise organization via a communication session with user device 130. Communications used to access to the enterprise organization through the online portal may be referred to as online communications. In some examples, online communications may include HTTP requests. The online portal may provide access to the enterprise organization over the Internet and may thus include one or more web pages and web services. Accordingly, user device 130 may be in communication with the online portal via a web browser on user device 130. In such examples, user device 130 may thus be, e.g., a desktop computer, a laptop computer, a tablet computer, a palmtop computer, a smartphone, and any other computing device capable of web access.

In aspects described herein, user device 130 may display, playback, or otherwise present prompts to a user to speak certain voice commands, such as a key phrase. In response, user device 130 may receive the spoken voice commands and may thereafter pass the voice commands to voice biometric authentication computing platform 110 and/or voice biometric training server 120 for analysis. When using a mobile application or web browser on user device 130, a user may speak the voice command into a microphone of the user device 130, and an audio file comprising the spoken voice command may be uploaded to the mobile portal or online portal.

Enterprise server infrastructure 160 may include one or more computing devices and/or other computer components (e.g., processors, memories, communication interfaces). In addition, and as illustrated in greater detail below, enterprise server infrastructure 160 may be configured to host, execute, and/or otherwise provide one or more enterprise applications. Enterprise server infrastructure 160 may also be configured to receive information from, send information to, and/or otherwise exchange information with one or more devices as described herein. The location where enterprise server infrastructure 160 is deployed may be remote from voice biometric authentication computing platform 110 and/or voice biometric training server 120 and/or user device 130 and/or user device 140.

For example, enterprise server infrastructure 160 may be configured to host, execute, and/or otherwise provide one or more speech processing programs, machine learning models, an enterprise mobile application for user devices, and/or other programs associated with an enterprise server, such as a trading platform. In some instances, enterprise server infrastructure 160 may be configured to provide various enterprise and/or back-office computing functions for an enterprise organization, such as a financial institution. For example, enterprise server infrastructure 160 may include various servers and/or databases that store and/or otherwise maintain account information, such as financial account information including account balances, transaction history, account owner information, trade history, market share information, trading portfolios, a trading platform, tax related documents and information, and/or other information. In addition, enterprise server infrastructure 160 may process and/or otherwise execute tasks on specific accounts based on commands and/or other information received from other computer systems included in computing environment 100. Additionally, or alternatively, enterprise server infrastructure 160 may receive instructions from voice biometric authentication computing platform 110 and then execute those instructions.

In some examples, enterprise server infrastructure 160 may be a component of a banking system. The banking system may include a customer database and various communication portals that provide access to the banking system. The communication portals of the banking system serve as entry points into the banking system to receive communications from a remote location, such as user device 130 or user device 140. The banking system may also include different types of communication portals to allow individuals to access the banking system using different types of devices. In some instances, the banking system may include an interactive voice response (IVR) portal, a mobile portal, and/or an online portal to facilitate communications with the banking system.

Enterprise data storage platform 170 may include one or more computing devices and/or other computer components (e.g., processors, memories, communication interfaces). In addition, and as illustrated in greater detail below, enterprise data storage platform 170 may be configured to receive information from, send information to, and/or otherwise exchange information with one or more devices as described herein. The location where enterprise data storage platform 170 is deployed may be remote from voice biometric authentication computing platform 110 and/or voice biometric training server 120 and/or user device 130 and/or user device 140 and/or enterprise server infrastructure 160. In addition, and as illustrated in greater detail below, enterprise data storage platform 170 may be configured to store and/or otherwise maintain enterprise data. Additionally, or alternatively, enterprise server infrastructure 160 may be configured to store and/or otherwise maintain enterprise data. For example, enterprise server infrastructure 160 may be configured to store and/or otherwise maintain task templates associated with users, historical data related to users, biometric identifiers associated with users, behavioral identifiers associated with users, location data of computing devices, and so forth. Additionally, or alternatively, enterprise server infrastructure 160 may load data from enterprise data storage platform 170, manipulate and/or otherwise process such data, and return modified data and/or other data to enterprise data storage platform 170 and/or to other computer systems included in computing environment 100.

In some embodiments, enterprise data storage platform 170 may store customer profiles. The customer profiles may include customer information relating to an enterprise organization customer. Customer information may include, for example, the name of the customer, contact information for the customer, and account information for the customer. Customer information may also include information that the enterprise organization may utilize to determine the identity or authenticate an individual such as answers to security questions, phone numbers or one or more network addresses from which the individual previously contacted the enterprise organization, device identification numbers of devices the individual has previously used to contact the enterprise organization, and other types of information that may be utilized to identify or authenticate an individual. Customer information may include other types of information related to enterprise organization customers.

In some arrangements, enterprise server infrastructure 160 and enterprise data storage platform 170 may be owned and/or operated by a first enterprise organization, and/or enterprise server infrastructure 160 and enterprise data storage platform 170 may be deployed an enterprise centers that are owned and/or operated by the first enterprise organization. In addition, voice biometric authentication computing platform 110 and voice biometric training server 120 may also be owned and/or operated by the first enterprise organization, and/or voice biometric authentication computing platform 110 and/or voice biometric training server 120 may be deployed an enterprise centers that are owned and/or operated by the first enterprise organization. Still in other examples, voice biometric authentication computing platform 110 and/or voice biometric training server 120 may be owned or operated by a different organization (e.g., a second enterprise organization) and/or voice biometric authentication computing platform 110 and/or voice biometric training server 120 may be deployed remote from the enterprise server infrastructure 160 and enterprise data storage platform 170. As illustrated in greater detail below, some aspects of the disclosure may provide technical benefits that are not found in conventional systems, because voice biometric authentication computing platform 110 may authenticate voice commands prior to such voice commands being processed, e.g., so as to access information associated with a user device from enterprise server infrastructure 160 and/or enterprise data storage platform 170.

Computing environment 100 also may include one or more networks, which may interconnect one or more of voice biometric authentication computing platform 110, voice biometric training server 120, user device 130, user device 140, enterprise server infrastructure 160, and enterprise data storage platform 170. For example, computing environment 100 may include a network 150 (which may, e.g., interconnect voice biometric authentication computing platform 110, voice biometric training server 120, user device 130, user device 140, enterprise server infrastructure 160, enterprise data storage platform 170, and/or one or more other systems which may be associated with an enterprise organization, such as a financial institution, with one or more other systems, public networks, sub-networks, and/or the like).

In one or more arrangements, voice biometric authentication computing platform 110, voice biometric training server 120, user device 130, user device 140, enterprise server infrastructure 160, and enterprise data storage platform 170 may be any type of computing device capable of receiving a user interface, receiving input via the user interface, and communicating the received input to one or more other computing devices. For example, voice biometric authentication computing platform 110, voice biometric training server 120, user device 130, user device 140, enterprise server infrastructure 160, enterprise data storage platform 170, and/or the other systems included in computing environment 100 may, in some instances, include one or more processors, memories, communication interfaces, storage devices, and/or other components. As noted above, and as illustrated in greater detail below, any and/or all of voice biometric authentication computing platform 110, voice biometric training server 120, user device 130, user device 140, enterprise server infrastructure 160, and enterprise data storage platform 170 may, in some instances, be special-purpose computing devices configured to perform specific functions.

Referring to FIG. 1B, voice biometric authentication computing platform 110 may include one or more processor (s) 111, memory(s) 112, and communication interface(s) 113. A data bus may interconnect processor 111, memory 112, and communication interface 113. Communication interface 113 may be a network interface configured to support communication between voice biometric authentication computing platform 110 and one or more networks (e.g., network 150 or the like). Memory 112 may include one or more program modules having instructions that when executed by processor 111 cause voice biometric authentication computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of voice biometric authentication computing platform 110 and/or by different computing devices that may form and/or otherwise make up voice biometric authentication computing platform 110. For example, memory 112 may have, store, and/or include an audio data processing engine 112a, a voice biometric authentication module 112b, a voice biometric database 112c, and a local synchronization module 112d. Audio data processing engine 112a may have instructions that direct and/or cause voice biometric authentication computing platform 110 to process audio files and determine voice commands associated with those audio files. Voice biometric authentication module 112b may verify that voice commands are associated with an authorized user, e.g., an account holder, based on analysis of voice biometrics, as discussed in greater detail below.

Voice biometric database 112c may store voice signatures or voice prints associated with authorized users, which may be used by voice biometric authentication module 112b and/or voice biometric training server 120 in setting up or updating the voice signatures. The voice biometric database 112c may include sets or collections of one or more voice biometric signatures. In some examples, the voice biometric signatures may comprise recordings of a key phrase recorded, e.g., during a setup process. Each voice biometric signature may be respectively associated with a customer profile in the voice biometric database 112c. In some examples, the key phrase may include the full name (first name and last name) of the customer. In some examples, the key phrase may include common voice commands for use with the virtual assistant. A key phrase may also be referred to, in some instances, as a passphrase. Local synchronization module 112d may have instructions that direct and/or cause voice biometric authentication computing platform 110 to synchronize device information (which may, e.g., include device signatures and/or other information associated with devices detected at various locations) with various enterprise systems (e.g., enterprise server infrastructure 160, enterprise data storage platform 170) which may be deployed at various enterprise locations and/or other systems. In some examples, memory 112 may have, store, and/or include a voice biometric engine, a voice signature engine, a speech-to-text engine, a filtering engine, a business rules engine, an authentication engine, and the like, and/or such components may be included and/or stored in one or more of audio data processing engine 112a, voice biometric authentication module 112b, voice biometric database 112c, or local synchronization module 112d.

The audio data processing engine 112a may be configured to generate a voice print as output when provided audio data as input. The voice print may be, for example, a string of alphabetic and numeric characters. Additionally, the voice print may include one or more characteristics relating to biometrics of the voice print. Accordingly, the audio data processing engine 112a may be configured to generate the string of alphabetic and numeric characters as output when provided voice audio data as input. During an enrollment process, an enterprise organization may ask a user to speak a key phrase and so as to provide audio data to the audio data processing engine 112a in order to obtain a voice print of the key phrase for the user. The voice print for the user may then be stored in the voice biometric database 112c and associated with a user profile for the user. When the user subsequently attempts to access account information, the user may be prompted to speak the key phrase again, e.g., in addition to or in combination with one or more other voice commands, and the audio data processing engine 112a may receive the spoken key phrase and generate a voice print for the spoken key phrase. The voice print may then be compared to one or more of the voice biometric signatures stored in the voice biometric database 112c.

The audio data processing engine 112a may be a commercially available automatic speech recognition (ASR) system. The voice biometric authentication computing platform may utilize the audio data processing engine 112a to convert an audio voice command to text. In certain examples, the voice command text may include a name of user in text form. The audio data processing engine 112a may extract the name of the individual from the voice command text. Because the extracted name is in text form, the voice biometric database 112c may be queried with the extracted name to obtain one or more voice biometric signatures respectively associated with users having that name.

The voice biometric authentication module 112b may be configured to compare the voice print of a voice command to a voice biometric signature (e.g., a voice print of a previous recording of the same voice command) and determine whether there is match. If there is a match, then the voice biometric authentication module 112b may conclude that the user that provided the voice command is the same user associated with the voice biometric signature. The voice biometric authentication module 112b may provide a confidence score quantifying the likelihood of a match between the voice command and the voice biometric signature. A relatively high confidence score may indicate a relatively high likelihood that the same user provided both the voice command and the voice biometric signature. A relatively low confidence score may indicate a relatively low likelihood that the same user provided both the voice and the voice biometric signature. Stated differently, a relatively low confidence score may indicate that one user provided the voice command and a different user provided the voice biometric signature. The voice biometric authentication module 112b may be configured for one-to-one voice biometric comparisons in which one voice command is compared with one voice biometric signature and, based on this comparison, one confidence score is generated for the comparison performed. The voice biometric authentication module 112b may also be configured for one-to-many voice print comparisons in which one voice command is compared to each voice biometric signature in a collection of multiple voice biometric signatures. For a one-to-many voice biometric comparison, the voice biometric authentication module 112b may generate a collection of multiple confidence scores for each respective comparison performed.

A collection of voice biometric signatures from voice biometric database 112c may be filtered before the collection of voice biometric signatures is provided to the voice biometric authentication module 112b. When the collection of voice biometric signatures is filtered, one or more voice biometric signatures may be removed from the collection such that the voice biometric authentication module 112b does not compare the voice command to the voice biometric signatures removed from the collection. A collection of voice biometric signatures may be filtered when a total number of voice biometric signatures to be provided to the voice biometric authentication module 112b exceeds a predetermined size threshold. The predetermined size threshold may be selected based on one or more capabilities of the voice biometric authentication module 112b to perform the comparisons within a desired response time.

A collection of voice biometric signatures from voice biometric database 112c may be filtered based on a variety of criteria. In some example implementations, a collection of voice biometric signatures may be filtered based on a characteristic of the voice command. As noted above, voice command may originate from a mobile communication or an online communication and may therefore be respectively associated with a phone number, network address, or device identifier, which may, for instance, be considered characteristics of the voice command. As also noted above, the voice biometric database 112c may store user information indicating previous voice communication received with respect to a user profile and information related to those previous voice communications, e.g., phone numbers, network addresses, or device identifiers. Through an association with a user profile, a stored voice biometric signature may also be associated with the previous voice communications received with respect to that user profile. Accordingly, in filtering the collection of voice biometric signatures based on one or more characteristics, the phone number, network address, or device identifier associated with a current voice command may be compared to the phone number, network address, or device identifier associated with an associated voice biometric signature. In some examples, filtering may be performed based on such comparisons to determine whether to remove a voice biometric signature from the collection of voice biometric signatures provided from voice biometric database 112c. It will be appreciated that the characteristics of current and previous voice commands and/or communications represent just one type of criteria by which a collection of voice biometric signatures may be filtered. Additional and alternative criteria may be selectively employed to filter a collection of voice biometric signatures.

In some examples, voice biometric authentication module 112b may apply various business rules related to the identification and authentication of a user. For example, a confidence score may be compared to a confidence threshold in order to determine whether or not to authenticate the voice command from a user. The voice biometric authentication module 112b may also determine whether to perform additional verification steps based on a comparison of the confidence score to a confidence threshold. The voice biometric authentication module 112b may also apply various business rules to direct a communication associated with the voice command once a voice command has been authenticated, e.g., in order to provide requested user account information.

In some examples, voice biometric authentication module 112b may perform further authentication of the identity of the user issuing a voice command. For example, voice biometric authentication module 112b may query a user database or a list of users of the voice biometric database 112c for security questions associated with a user profile and issue challenges to a user attempting to access account information, based on certain determinations made by the voice biometric authentication module 112b, such as a confidence score of the voice command being below a threshold. The challenges may prompt the user to provide an answer to a security question. The voice biometric authentication module 112b may then authenticate or reject the identity of user depending on the number of challenges answered correctly. The voice biometric authentication module 112b may also communicate the number of challenges answered correctly or incorrectly to another device (e.g., user device 140 or enterprise server infrastructure 160), for further determination as to how to handle the voice command session. Security questions posed may be based on static information (e.g., "What street did you grow up on?") or dynamic information (e.g., "Which restaurant did you eat at within the last week?").

If the voice command is authenticated, then the user issuing the voice command may be granted access information relating to associated user accounts and other relate services. Authentication of a voice command is described in further detail below.

Figure 2A:
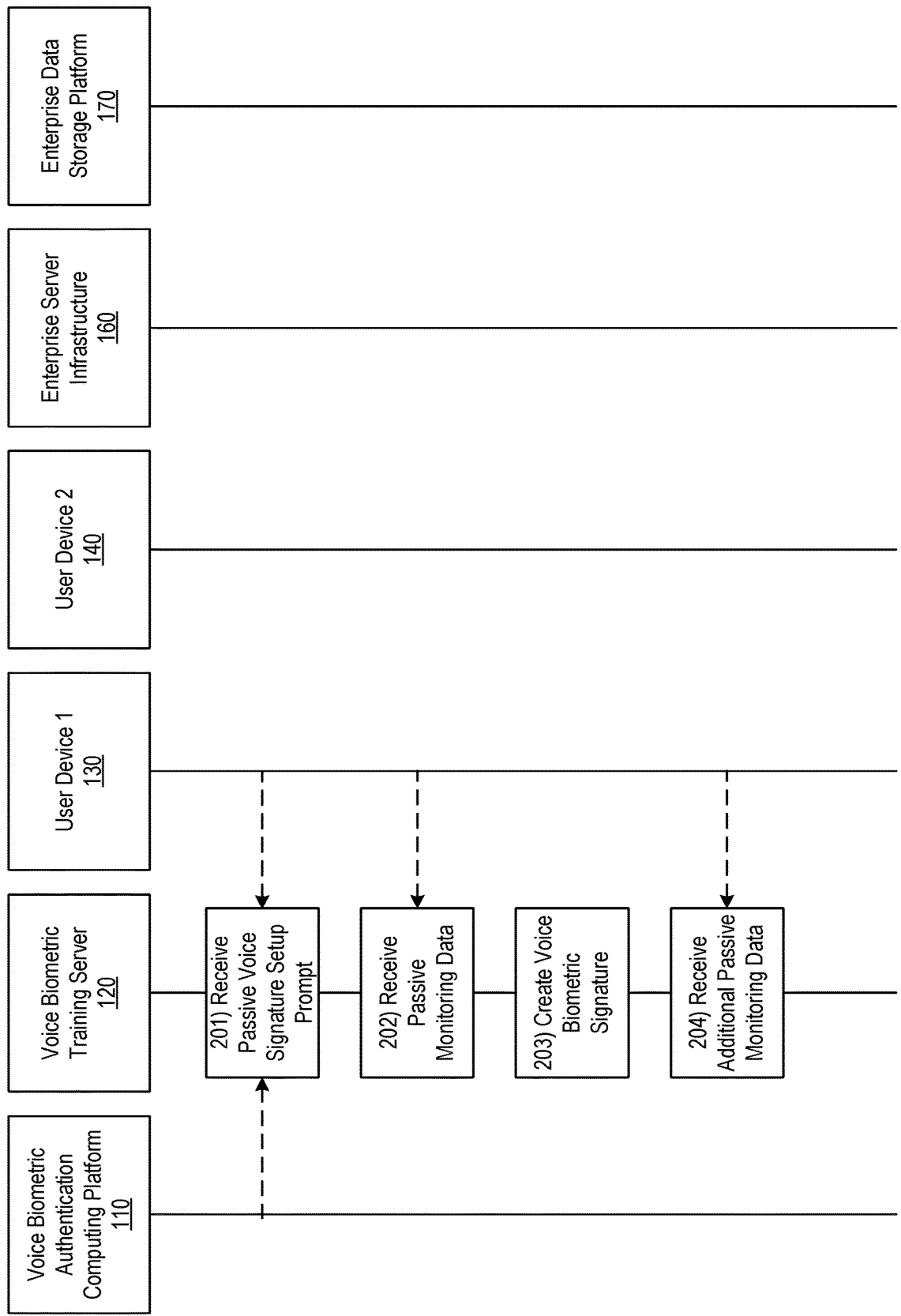
Figure 2C:
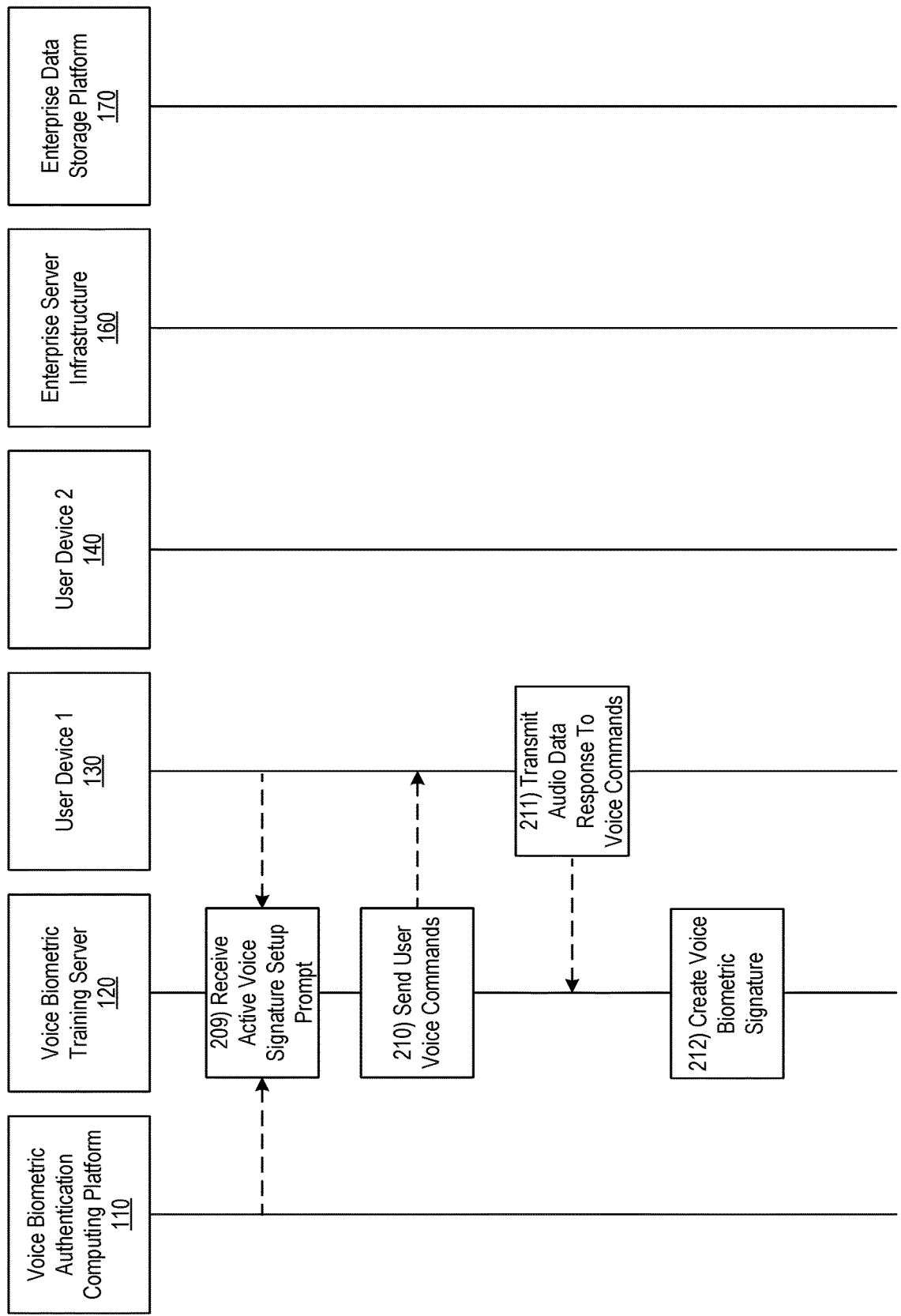

Two approaches to voice biometrics technology may be employed: passive voice biometrics and active voice biometrics. With passive voice biometrics, any speech received from user may be processed, analyzed and, in some instances, matched to a previously obtained voice biometric signature. With active voice biometrics, an audio file of a phrase spoken by user may be received responsive to a prompt for the phrase, and that audio file may be processed and analyzed, and in some instances, matched to a previously obtained voice biometric signature corresponding to that phrase. In either case, a voice biometric signature may be created and/or refined for a particular user, and voice biometrics may indicate whether a user associated with a voice command and a user associated with the voice biometric signature are the same. FIGS. 2A-2B depict an illustrative event sequence for a passive voice biometric setup at a voice biometric training server in accordance with one or more example embodiments. FIGS. 2C-2D depict an illustrative event sequence for an active voice biometric setup at a voice biometric training server in accordance with one or more example embodiments.

Figure 3:
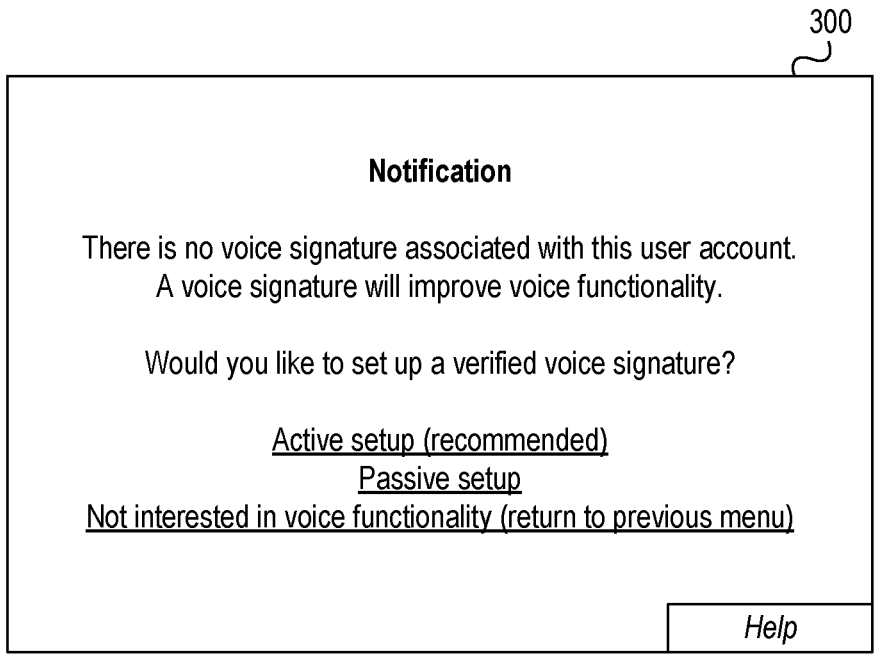
FIGS. 3-5 depict example graphical user interfaces for devices using biometric voice authentication in a virtual assistant in accordance with one or more example embodiments.

For example, voice biometric authentication computing platform 110 may determine that a voice signature associated with a user or a user account has not yet been setup, which may cause a user device (e.g., user device 130 or user device 140) to generate, display, and/or otherwise present a graphical user interface similar to graphical user interface 300, which is illustrated in FIG. 3. As seen in FIG. 3, graphical user interface 300 may include text and/or other information indicating a voice signature for the user account was not detected and prompting the user to initiate a set process (e.g., "There is no voice signature associated with this user account. A voice signature will improve voice functionality. Would you like to set up a verified voice signature?") as well as one or more user-selectable controls allowing the user of the user device, such as user device 130 or user device 140 to make a selection (e.g., "Active setup (recommended)|Passive setup|Not interested in voice functionality (return to main menu)"). In that regard, the graphical user interface 300 may include a recommended option ("Active setup" in FIG. 3). For example, an active voice signature setup may be a recommended option to the extent that it may produce to a more accurate voice signature. However in other examples, other options may be recommended options. For example, if time is a concern, a passive voice signature setup may be recommended ("Passive setup") as it may create a signature while requiring less time from the user (e.g., in not requiring the specified voice commands from the user as will be described in more detail below). In some examples, a selection to not create a voice signature may be provided as an option ("Not interested in voice functionality (return to previous menu)") and may be useful to users who do not expect to use voice functionality with a respective device. In some examples, a selection to not create a voice signature may be a recommended option, e.g., where the user device is shared with many different users and may be likely subjected to unauthorized voice commands.

In some embodiments, prompting the user to create a voice signature may include providing the user with information regarding the various setup options so that the user may be able to make a more informed selection. For example, in prompting the user, there may be a selection to obtain more information associated with the various selections. In some embodiments, a recommended selection may be determined based on information associated with the user account and/or user device, such as if other users use the device, how many users user the user device, account settings of the user account, and the like. In some embodiments, prompting the user to create a voice signature may occur upon a user first issuing a voice command, upon a user first logging in to the user account from a particular voice-enabled device, upon a user downloading an application associated with an enterprise organization for which the user has an account, and the like.

Referring to FIG. 2A, at step 201, voice biometric training server 120 may receive a prompt for a passive voice signature setup. For example, at step 201, voice biometric authentication computing platform 110 or user device 130 may initiate the prompt (e.g., by a user selection at user device 130 or based on a determination at voice biometric authentication computing platform 110 that no voice signature exists for a user account) and thereafter the prompt may be transmitted to voice biometric training server 120. For instance, a user selection may be received at user device 130, and user device 130 may thereafter transmit the prompt for a passive voice signature setup to voice biometric training server 120. As described above and as shown in the example graphical user interface 300 of FIG. 3, this prompt may be based on a selection between an active voice signature setup and a passive voice signature setup. In some examples, this prompt may simply be based on a user selecting not to perform an active voice signature setup. As another example, voice biometric authentication computing platform 110 may determine that there is no voice signature associated with a particular user account (e.g., a user account associated with user device 130 and/or user device 140), and voice biometric authentication computing platform 110 may thereafter transmit the prompt for a passive voice signature setup to voice biometric training server 120. Such a setup may also be automatically prompted upon a user first issuing voice commands, e.g., from user device 130.

At step 202, voice biometric training server 120 may receive passive voice monitoring data from, e.g., user device 130, user device 140, and/or one or more other data sources. For example, at step 202, voice biometric training server 120 may receive any speech from an individual at user device 130. As another example, voice biometric training server 120 may receive any speech associated with use of voice commands to access a user account independent of a device that receives the voice command (e.g., upon a second-factor user authentication, such as a password, fingerprint, or the like). Voice biometric training server 120 may receive, via the communication interface (e.g., communication interface 113 of voice biometric authentication computing platform 110 or a communication interface of voice biometric training server 120), from one or more data source computer systems (e.g., from user device 130, user device 140, and/or one or more other data sources), passive voice monitoring data. The passive voice monitoring data may, for instance, include any number of voice data, including voice commands relating to access an account balance, verifying one or more transactions of an account, accessing one or more settings of the user account, accessing account activity data, accessing previous or scheduled transfers, changing transfers, creating news transfers, and the like. The passive voice monitoring data may, for instance, simply include regular speech by an individual, e.g., speech that is not specific to voice command for the virtual assistant. The passive voice monitoring data may, for instance, be specific to a customers and/or other individual, and/or may be specific to a device.

At step 203, voice biometric training server 120 may setup an initial voice print or voice signature based on the passive voice monitoring data. For example, at step 203, voice biometric training server 120 may apply a type of voice signature model specific to the range, quantity and/or type of passive voice monitoring data received from the one or more data source computer systems. For instance, voice biometric training server 120 may apply certain settings or characteristics in creating the voice biometric signature, e.g., based on the prompt received at step 201. The accuracy of the voice biometric signature created at step 203 may be based on factor associated with the passive voice monitoring data received, such as the quality, quantity, uniformity, repeatability, and the like. Creating the voice biometric signature at step 203 may also entail quantifying the accuracy of the signature, e.g., by computing a confidence level associated to the voice biometric signature. In some examples, step 203 may only be performed upon the receipt of a sufficient amount or quality of received passive voice monitoring data. In some examples, an alert may be sent to a user device (e.g., user device 130 or user device 140) if an amount of time has passed and a sufficient amount and/or quality of passive voice monitoring data has still not yet been received. In such examples, the alert may also include a prompt to initiate an active voice biometric signature setup.

In some embodiments, voice biometric training server 120 may be setup to continue receiving additional passive voice monitoring data after an initial voice biometric signature has been created. In that regard, at step 204, voice biometric training server 120 may receive additional passive voice monitoring data. The additional passive voice monitoring data received at step 204 may be similar to the passive voice monitoring data received at step 202. In some examples, the additional passive voice monitoring data received at step 204 may only be specific to user commands using the virtual assistant and/or user commands related to accessing information associated with the user account for the first enterprise organization. In some examples, the additional passive voice monitoring data received at step 204 may include all speech detected at a device of the user, such as user device 130 or user device 140. In some examples, receiving additional passive voice monitoring data at step 204 may be based on a user selection to continue to refine the voice signature, or based on a command from voice biometric authentication computing platform 110 to continue to refine the voice signature. In some example, continuing to refine the voice signature may be based on a confidence level associated to the voice biometric signature created at step 203.

Now referring to FIG. 2B, at step 205, voice biometric training server 120 verifies that the additional passive voice monitoring data matches the voice biometric signature created at step 203. In some embodiments, step 205 may include applying a voice biometric signature matching algorithm, as will be described in more detail below. The voice biometric matching algorithm may take into account a number of features regarding the voice biometric signature, such as the confidence interval associated with the voice biometric signature, the amount of passive voice monitoring data the was received at step 202 relative to the additional passive voice monitoring data received at step 204, the type of voice command(s) associated with the additional passive voice monitoring data received at step 204, and the like.

Upon determining that there is a mismatch between the additional passive voice monitoring data and the voice biometric signature, voice biometric training server 120 may update or refine the voice biometric signature at step 206. Following the receipt and analysis of additional passive voice monitoring data relative to the voice biometric signature at step 205 and, in some cases, updating the voice biometric signature at step 206, the confidence level associated with the voice biometric signature may be computed (or recomputed) at step 207.

At step 208, the voice biometric signature, created, and in some cases refined, using a passive voice signature setup, may be transmitted for storage in a voice biometric database. As shown in FIG. 1B, voice biometric database 112c may be part of the voice biometric authentication computing platform 110. In other examples, the voice biometric database may be located in enterprise data storage platform 170. Still in other examples, the voice biometric database may be located in various other locations without departing from the scope of the present disclosure, including but not limited to voice biometric training server 120, user device 130, user device 140, and/or enterprise server infrastructure 160. In some examples, steps 205 and 207 may be skipped, e.g., if the initially created voice biometric signature at step 203 is associated with a high confidence level. Still, in some examples, step 205, 206, 207, and 208 may be repeated one or more times to continue to refine and update the voice biometric signature.

Now referring to FIG. 2C, an illustrative event sequence for an active voice biometric setup at a voice biometric training server is depicted in accordance with one or more example embodiments. At step 209, voice biometric training server 120 may receive a prompt for an active voice signature setup. For example, at step 209, voice biometric authentication computing platform 110 or user device 130 may initiate the prompt (e.g., by a user selection at user device 130 or based on a determination at voice biometric authentication computing platform 110 that no voice signature exists for a user account) and thereafter transmit the prompt to voice biometric training server 120. Such a prompt may include causing a user device (e.g., user device 130 or user device 140) to generate, display, and/or otherwise present a graphical user interface similar to graphical user interface 300, which is illustrated in FIG. 3, and the subsequent selection by the user for an active voice signature setup ("Active setup (recommended)"). An active voice biometric may be a recommended option where such a setup is likely to result in a more accurate voice biometric signature of the user.

For instance, a user selection may be received at user device 130, and user device 130 may thereafter transmit the prompt for an active voice signature setup to voice biometric training server 120. In some examples, this prompt may simply be automatically initiated based on a type of user device and/or a type of user account associated with the user. In particular, and to the extent that an active voice biometric may be a recommended option where such a setup is likely to result in a more accurate voice biometric signature of the user, the voice biometric authentication computing platform 110 may determine that an active voice signature setup is to be performed in examples where a higher level of security is sought to protect against unauthorized voice commands. As another example, voice biometric authentication computing platform 110 may simply determine that there is no voice signature associated with a particular user account (e.g., a user account associated with user device 130 and/or user device 140), and voice biometric authentication computing platform 110 may thereafter transmit the prompt for an active voice signature setup to voice biometric training server 120. Such a setup may also be automatically prompted upon a user first issuing voice commands, e.g., from user device 130.

At step 210, voice biometric training server 120 send user voice commands to a user device (e.g., user device 130, user device 140). The user voice commands may include a series of example voice commands that would be used to access account information associated with a user (e.g., "check balance," "transfer funds," "verify recent transactions," and the like). In some examples, the user voice commands may include a series of words or phrases that allow voice biometric training server 120 to establish a voice biometric fingerprint for any number of voice command phrases. The user voice commands may be provided to a user device for audio and/or video playback, display, or other type of presentation by the user device. In response to the user voice commands, audio data responsive to each of the user voice commands at step 211. The audio data may be transmitted from a user device, such as user device 130 or user device 140. For example, at step 210, voice biometric training server 120 may send a single user voice command and, upon receipt of audio data response to that single user voice command from a user device at step 211, steps 210 and 211 may be repeated an additional number of times with additional user voice commands. As another example, voice biometric training server 120 may send a series of user voice commands at once at step 210, and at step 211 audio data may be transmitted to voice biometric training server 120 responsive to each of the series of user voice commands. Voice biometric training server 120 may receive, via the communication interface (e.g., communication interface 113 of voice biometric authentication computing platform 110 or a communication interface of voice biometric training server 120), from one or more data source computer systems (e.g., from user device 130, user device 140, and/or one or more other data sources), audio data responsive to the user voice commands.

At step 212, voice biometric training server 120 may setup an initial voice print or voice signature based on the audio data responsive to the user voice commands. For example, at step 212, voice biometric training server 120 may apply type of voice signature model specific to the range, quantity and/or type of audio data received from the one or more user devices. For instance, voice biometric training server 120 may apply certain settings or characteristics in creating the voice biometric signature. The accuracy of the voice biometric signature created at step 212 may be based on factors associated with the audio data received, such as the quality, quantity, uniformity, repeatability, and the like. Creating the voice biometric signature at step 212 may also entail quantifying the accuracy of the signature, e.g., by computing a confidence level associated to the voice biometric signature. In some examples, step 212 may only be performed upon the receipt of a certain quality of audio data responsive to the user voice commands. In some examples, an alert may be sent to a user device (e.g., user device 130 or user device 140) if the quality of the audio data is insufficient to create a biometric voice signature. In some embodiments, voice biometric training server 120 may continue to send user voice commands and receive audio data responsive to those user voice commands until there is sufficient voice command data to create the voice biometric signature at step 212. In some examples, sending additional user commands and thereafter receiving audio data responsive to the user voice commands may be based on a user selection to continue to refine the voice signature, or based on a command from voice biometric authentication computing platform 110 to continue to refine the voice signature.

Now referring to FIG. 2D, the confidence level associated with the voice biometric signature may be computed at step 213. In some examples, the voice biometric signature may continue to be refined based on a confidence level associated to the voice biometric signature computed at step 213, e.g., by continuing to collect additional audio data. At step 214, the voice biometric signature, created using an active voice signature setup, may be transmitted for storage in a voice biometric database. In some examples, the voice biometric database may be located in enterprise data storage platform 170 or in voice biometric database 112c of voice biometric authentication computing platform 110. Still in other examples, the voice biometric database may be located in various other locations without departing from the scope of the present disclosure, including but not limited to voice biometric training server 120, user device 130, user device 140, and/or enterprise server infrastructure 160.

Figure 2E:
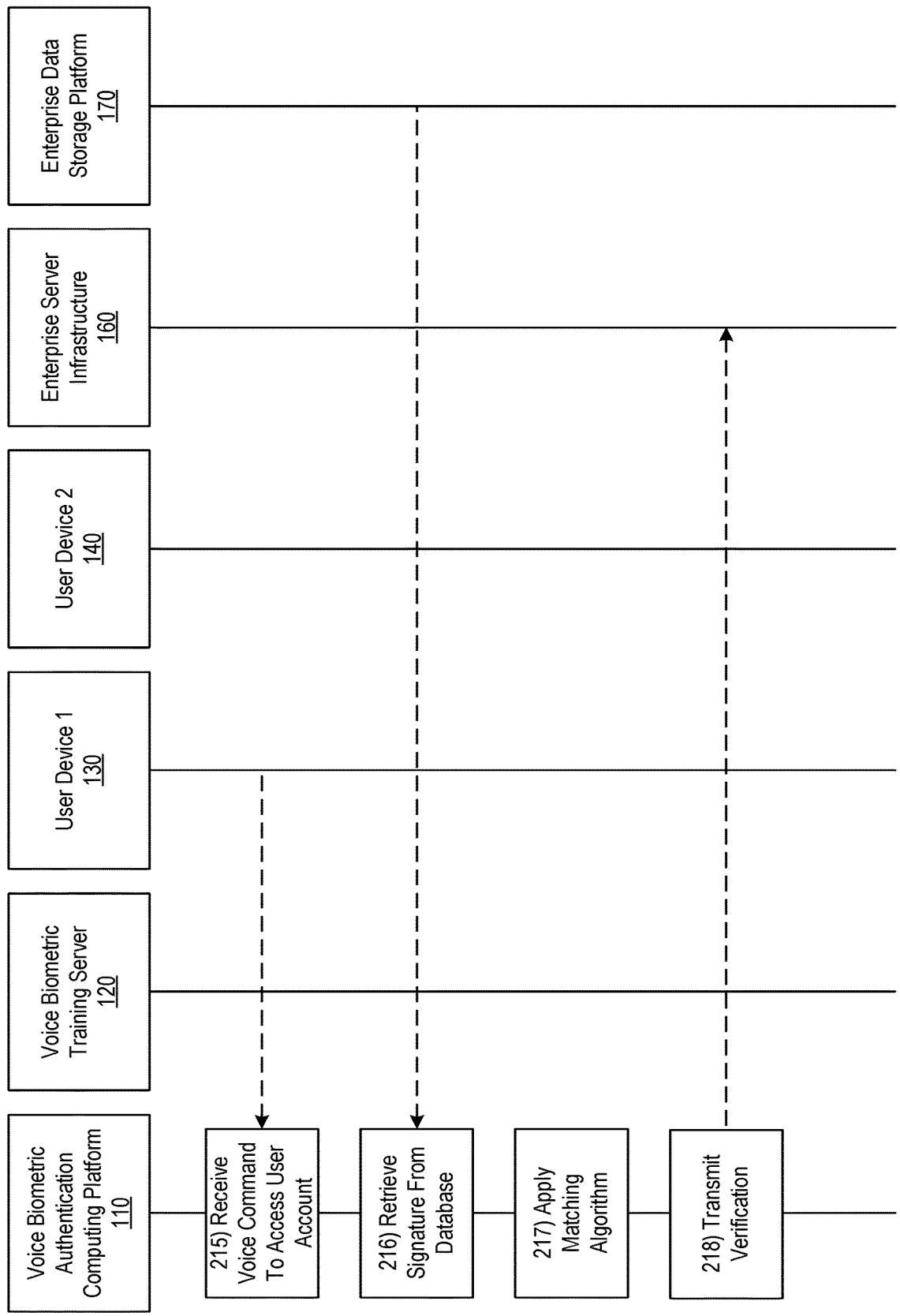
FIGS. 2E-2G depict an illustrative event sequence for a voice biometric authentication at a voice biometric authentication computing platform in accordance with one or more example embodiments.

Referring to FIG. 2E, an illustrative event sequence for a voice biometric authentication at a voice biometric authentication computing platform is depicted. The voice biometric authentication may occur after a voice signature is set up, e.g., in accordance with the voice signature setup event sequences described for FIG. 2A-2B or 2C-2D. At step 215, voice biometric authentication computing platform 110 may receive, via communication interface 113, an audio file comprising a voice command to access information related to a user account. For example, at step 215, the voice command may be sent from user device 130, which is equipped with a virtual assistant having IVR features, as described above. In some examples, user device 130 may be a device associated with a user account (e.g., in which a verified user account access previously occurred). In some examples, certain types or classifications of voice commands received at step 215 may trigger the voice authentication process. In some examples, all voice commands received at step 215 may initiate the voice authentication process.

In some aspects, a particular user account may be associated with user device 130, e.g., if user device 130 is currently logged into the user account in an application, if user device 130 was previously logged into the user account, if the user account is associated with user device 130, and the like. In some aspects, a particular user account may be referenced by a keyword in the voice command, such as by identifying a name on the user account, by identifying an account number, by identifying an account username and/or password or passcode, and the like. In some aspects, one or more users may be associated with user device 130, each of the one or more users may have one or more user accounts. As described in more detail below, voice biometric authentication computing platform 110 may, in some examples, analyze voice biometrics associated with the one or more users as part of authenticating the voice command received at step 215.

Authentication, as used in this description, may refer to verifying the identity of a user, such as the user that provides the voice command. Authentication may include identifying a user associated with the user account and verifying that the voice command match voice biometrics associated with the user of the user account. In some instances, more than one user may be associated with a user account, and authentication may include analyzing the voice command with respect to voice biometrics of each of the more than one user. When the voice command include a keyword identifying an aspect of the user account, authentication may include verifying that the information associated with the keyword along with voice biometrics of the voice command.

After receiving the voice command, voice biometric authentication computing platform 110 may retrieve one or more voice biometric signatures associated with the user account from a voice biometric database at step 216. As described above, the voice biometric database may be voice biometric database 112c. Still in other examples, the voice biometric database may be located in various other locations without departing from the scope of the present disclosure, including but not limited to voice biometric training server 120, user device 130, user device 140, enterprise server infrastructure 160, and/or enterprise data storage platform 170. The retrieved voice biometric signature may be specific to a particular user or particular to a voice command by the user. The voice biometric database may be queried for voice biometric signatures associated with a name on the user account. In some examples, a plurality of voice biometric signatures may be retrieved, e.g., where more than one user is associated with a user account. In some examples, a voice biometric signature may be associated with a key phrase, and there may thus be a plurality of voice biometric signatures, each associated with a different key phrase. Voice biometric authentication computing platform 110 may employ various search and/or filtering techniques to identify and retrieve the one or more voice biometric signatures associated with the user account. For instance, voice biometric authentication computing platform 110 may filter a resultant set of voice biometric signatures based on a characteristic of the voice command received at step 215, e.g., to identify one or more voice biometric signatures with a same or similar characteristic. In some examples, the voice command may include a key phrase that includes an identifier associated with the user and/or user account. One or more voice biometric signatures may then be retrieved based on the identifier included in the key phrase. For example, the voice biometric database may be queried to identify one or more voice biometric signatures that are associated with a name on a user account that matches a name included in the key phrase. In some examples, voice biometric authentication computing platform 110 may determine that there are no voice biometric signatures in the voice biometric database, and may thereafter transmit a prompt to the user device related to the setup of a voice biometric signature. Such a prompt may include the display of graphical user interface 300 of FIG. 3.

At step 217, based on applying a voice biometric matching algorithm to compare the voice command of the audio file to the one or more voice biometric signatures, voice biometric authentication computing platform 110 may determine if a match exists between the voice command and one of the one or more voice biometric signatures. The voice biometric matching algorithm may take into account a number of features regarding the voice biometric signature, such as the confidence interval associated with the voice biometric signature, a classification of the voice command, one or more key phrases included in the voice command, and the like. The voice biometric matching algorithm may include comparing a number of features of the voice command to the voice biometric signature, such as tonality, pitch, loudness, phonation, rate, and the like. In some examples, the voice biometric matching algorithm may determine a relative match amount or relative match percentage to quantify a degree to which the voice command and the one or more voice biometric signatures match. The relative match amount or relative match percentage may be compared to a match threshold to determine if the voice command sufficiently matches the one or more voice biometric signatures.

As part of step 217, voice biometric authentication computing platform 110 may compute a confidence score based on comparing the voice command to the one or more voice biometric signatures. The confidence score may quantify the likelihood that the user that provided the voice command is also associated with the one or more voice biometric signatures. In examples where more than one voice biometric signatures are compared to a single voice command, voice biometric authentication computing platform 110 may identify a voice biometric signature having the higher confidence score and using that voice biometric signature for subsequent steps, e.g., for accessing user account information associated with the voice biometric signature. It will be appreciated, however, that even though a voice biometric signature has the highest confidence score from plurality of voice biometric signatures, the confidence score may nonetheless not be high enough to justify authenticating the voice command. Accordingly, the highest confidence score may be compared to a lower threshold and an upper threshold. If the confidence score is less than the lower threshold, then voice biometric authentication computing platform 110 may determine to not authenticate the voice command. If, however, the confidence score is greater than the lower threshold, then voice biometric authentication computing platform 110 may authenticate the voice command. In some situations, the confidence score may be greater than the lower threshold but less than the upper threshold. In these situations, voice biometric authentication computing platform 110 may perform additional steps in an attempt to verify the voice command. For example, voice biometric authentication computing platform 110 may prompt the user at user device 130 to answer one or more security questions, based on security questions and answers associated with user account and/or associated with the voice biometric signature having the highest confidence score, as an additional step. If the user cannot provide correct answers to the security questions, then voice biometric authentication computing platform 110 might not authenticate the voice command. If, however, the user can provide correct answers to the security questions, then voice biometric authentication computing platform 110 may authenticate the voice command and access information associated with the user account. Once the voice command is authenticated, voice biometric authentication computing platform 110 may be able to access information related to the user account.

In response to determining that a match exists between the voice command and one of the one or more voice biometric signatures, voice biometric authentication computing platform 110 may transmit a verification of the match, e.g., a user identity verification, to enterprise server infrastructure 160 at step 217 and then retrieve information associated with the user account from enterprise server infrastructure 160 or from enterprise data storage platform 170. Thereafter, voice biometric authentication computing platform 110 may send, via the communication interface 113, the information associated with the user account to user device 130. The retrieved information may be specific to the type of voice command received at step 215. The retrieved information may be provided to the user via user device 130, using any combination of presentation formats, such as an audio display, a video display, a text-based message, and the like.

Figure 2F:
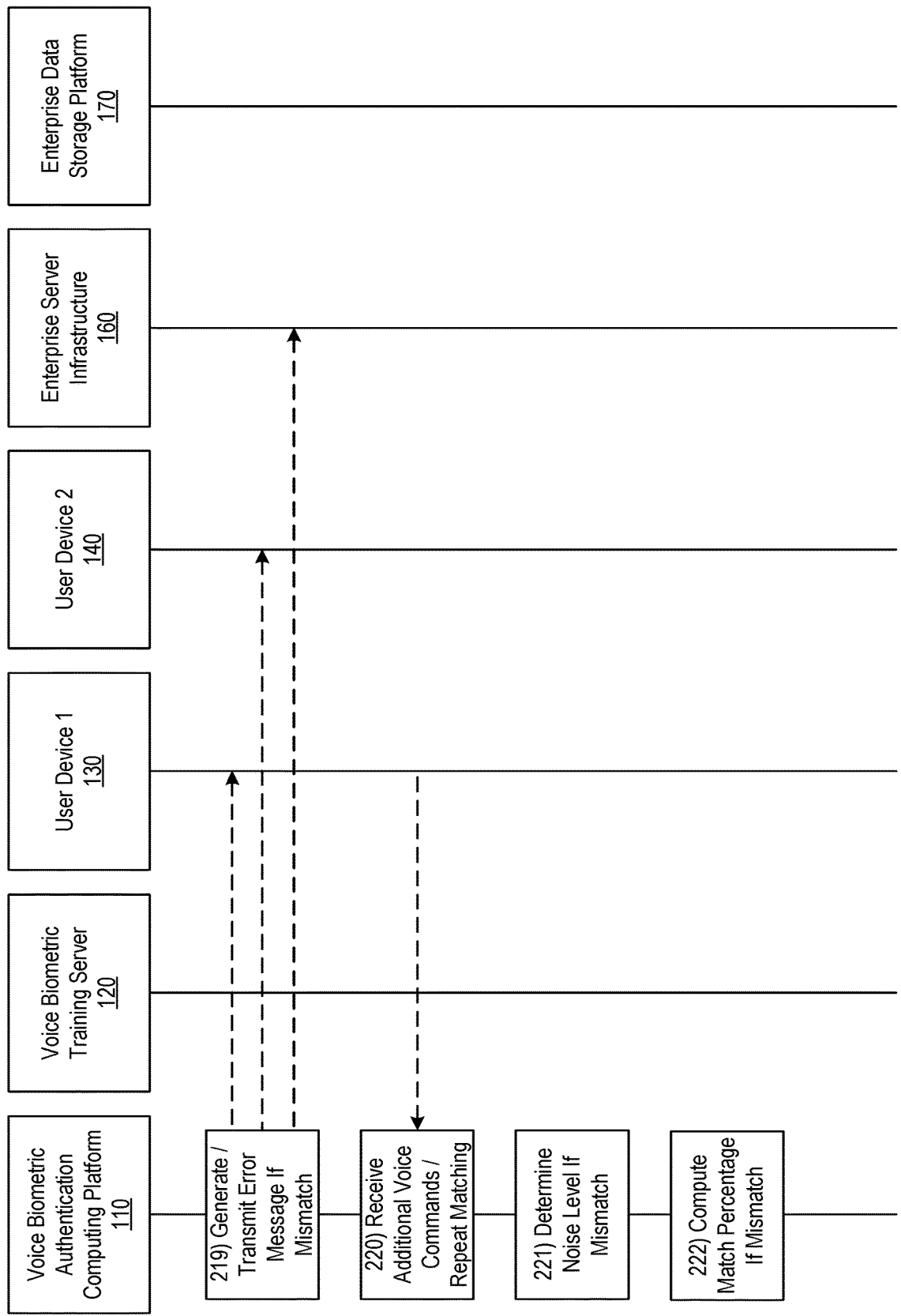
Figure 4:
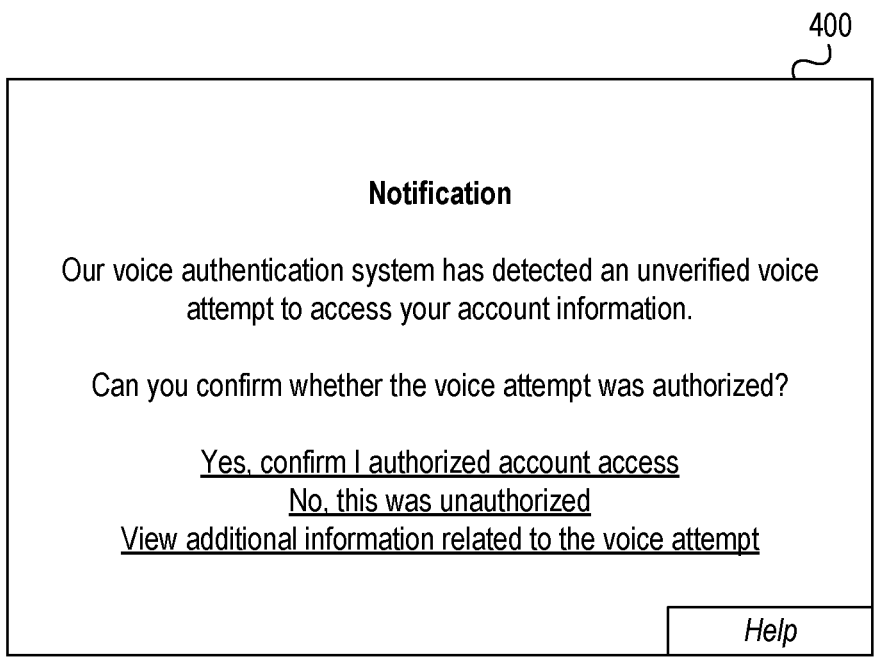
Figure 5:
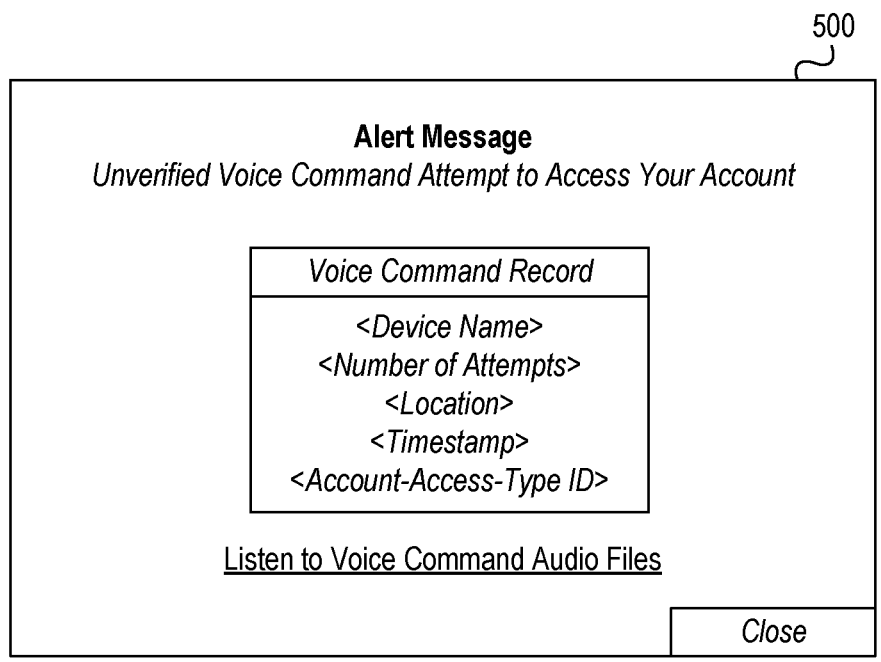

Referring to FIG. 2F, in response to determining a mismatch between the voice command and one of the one or more voice biometric signatures, voice biometric authentication computing platform 110 may generate an error message at step 219, and the error message may comprise at least one of: an audio file, a video file, an image file, or text content. The error message may be transmitted to user device 130 to notify the user at user device 130 that the voice command could not be authenticated. Additionally, or alternatively, the error message may be transmitted to user device 140 (e.g., as verified device associated with the user account) and/or to enterprise server infrastructure 160 to notify the enterprise organize that a voice command was received that could not be authenticated. In some examples, transmitting the error message to user device 130 may also include providing a prompt at user device 130 to receive an additional voice command in order to re-attempt authenticating a voice command, as will be described in more detail below. Additionally or alternatively, transmitting the error message to user device 140 as part of step 219, va110 may generate and/or send information to user device 140 which may cause user device 140 to generate, display, and/or otherwise present a graphical user interface similar to graphical user interface 400, which is illustrated in FIG. 4. As seen in FIG. 4, graphical user interface 400 may include text and/or other information indicating an unverified or unauthenticated voice command by the voice biometric authentication computing platform 110 (e.g., "Our voice authentication system has detected an unverified voice attempt to access your account information. Can you confirm whether the voice attempt was authorized?") as well as one or more user-selectable options allowing the user to respond to the attempt (e.g., "Yes, confirm I authorized access|No, this was unauthorized|View additional information related to the voice attempt"). Selection of the "Yes" option may cause voice biometric authentication computing platform 110 to update a voice biometric signature updated with the user account, based on the falsely undetected unauthorized voice command. Selection of the "No" option may cause voice biometric authentication computing platform 110 to transmit a message to user device 130 confirming that the attempt to access the user account was verified to be unauthorized. Selection of the "View additional information related to the voice attempt" may cause user device 140 to generate, display, and/or otherwise present another graphical user interface similar to graphical user interface 500, which is illustrated in FIG. 5. As seen in FIG. 5, graphical user interface 500 may include text and/or other information relating to the unverified or unauthenticated voice command by the voice biometric authentication computing platform 110 (e.g., "Alert Message Unverified voice command attempt to access your account") as well as one or more additional information components related to the attempt (e.g., a name of the device, a number of voice command attempt(s) made, a location where the voice command attempt(s) were made, a timestamp of the voice command attempt(s), an identification of the type of user account information associated with the voice command attempt(s), and the like), as well as one or more user-selectable options allowing the user to listen to the voice command attempt(s) (e.g., "Listen to voice command audio files").

At step 220, additional voice commands may be received and additional matching may be determined using the voice biometric matching algorithm (essentially repeating steps 215-219). In some embodiments, the computing platform may receive, from the user device, a second audio file comprising a second voice command to initiate a transaction related to a user account related to the user account, or access additional information related to the user account. Then, the computing platform may apply the voice biometric matching algorithm to compare the second voice command of the second audio file to the one or more voice biometric signatures to determine if a match exists between the second voice command and one of the one or more voice biometric signatures. In response to determining that a match exists between the second voice command and one of the one or more voice biometric signatures, the computing platform may transmit a notification comprising a transaction verification to an enterprise server.

In some embodiments, voice biometric authentication computing platform 110 may, in response to determining a mismatch between the voice command and the one or more voice biometric signatures, determine a level of background noise associated with the audio file at step 221. In response to determining that the level of background noise is higher than a noise threshold, voice biometric authentication computing platform 110 may generate a message to transmit to user device 130, and the message may include an indication that the voice command was not verified and a request for a repeat voice command with a lower level of background noise. In some embodiments, upon thereafter sensing that a level of background noise at the user device is lower than the threshold, voice biometric authentication computing platform 110 may transmit a prompt to user device 130 to obtain the repeat voice command. Accordingly, in such embodiments, voice biometric authentication computing platform 110 my treat unverified voice command attempts with noisy backgrounds as potentially false positives (for detecting an unverified attempt) and may allow the user to repeat the voice command.

At step 222, voice biometric authentication computing platform 110 may, in response to determining a mismatch between the voice command and the one or more voice biometric signatures, determine if a match percentage is above a match threshold. The match threshold may be considered a minimum amount of a match detected for which it is still possible for a user to repeat a voice command and have such voice command authenticated, e.g., if the initially voice command was spoken unclearly or was interrupted by other noise in the environment. Additionally, or alternatively, voice biometric authentication computing platform 110 may determine a match percentage based on a confidence level and/or based on comparing a confidence level to a threshold.

Figure 2G:
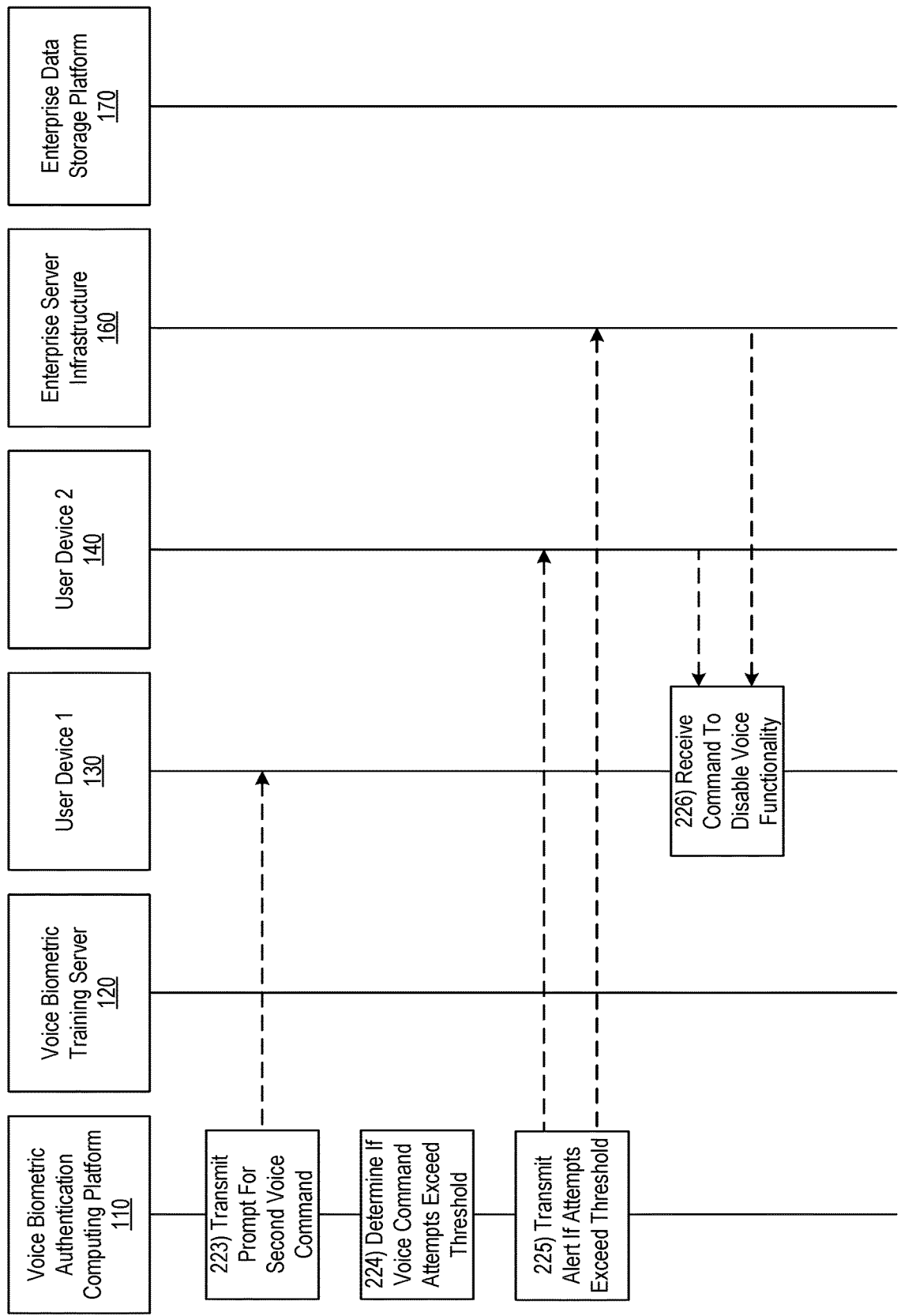

Referring to FIG. 2G, voice biometric authentication computing platform 110 may transmit a prompt to user device 130 to obtain another voice command at step 223, e.g., in response to determining that the level of background noise is above a threshold and/or or in response to determining that the match percentage is not above a threshold but that a mismatch was determined. In some embodiments, based on determining that the match percentage is above a threshold, voice biometric authentication computing platform 110 may generate a message to transmit to user device 130, and the message may comprise a request for a repeat voice command. Voice biometric authentication computing platform 110 may, in response to determining that the match percentage is below a threshold and/or in response to determining that the level of background noise is lower than a threshold, generate an alert comprising a notification of an unverified or unauthorized voice command attempt at user device 130. For example, an alert may be generated if mismatch percentage is too low (or lower than a threshold) from a low background noise command (or having a background noise level lower than a threshold). Then, voice biometric authentication computing platform 110 may send, via communication interface 113, the alert to enterprise server infrastructure 160. In some examples, voice biometric authentication computing platform 110 may also send, via communication interface, a user account access rejection message to user device 130, that notifies the user that the voice command(s) were not authenticated and that access to the user account was rejected. The user account access rejection message may include an audio output alert message for playback on user device 130 and that indicates that the voice commands to access the user account could be verified.

At step 224, voice biometric authentication computing platform 110 may determine if a number of voice command attempts exceeds an attempt threshold. Upon determining that the number of voice command attempts exceeds the attempt threshold, voice biometric authentication computing platform 110 may generate an alert comprising a notification of unauthorized voice command attempts at user device 130. Then, at step 225, voice biometric authentication computing platform 110 may send, via the communication interface 113, the alert to enterprise server infrastructure 160. In some embodiments, upon determining that the number of voice command attempts exceeds the attempt threshold, voice biometric authentication computing platform 110 may send, via the communication interface 113, the alert to user device 140, where user device 140 may be a user account verified device, and the alert may comprise information related to the number of voice command attempts. The information may include information specific to user device 130, such as device signature, device properties, device location, device operating system information, other device properties, and the like. Such information may assist user associated with user device 140 to identify aspects of the voice command attempts by user device 130, e.g., user device is stolen device that was previously in possession of the user. The generation of such alert message may occur in real time as voice command attempt are received at voice biometric authentication computing platform 110. For example, voice biometric authentication computing platform 110 may send, via the communication interface (e.g., communication interface 113), to one or more client computing devices (e.g., user device 140), one or more client account notifications generated based determination of unverified or unauthorized voice command attempt(s). By sending the one or more client account notifications to user device 140, voice biometric authentication computing platform 110 may, for instance, alert a customer of an enterprise organization that his/her account information and/or other private information may be at risk and/or was subject to an attempt at unauthorized access.

At step 226, upon determining that the number of voice command attempts exceeds the attempt threshold, voice biometric authentication computing platform 110 (and/or user device 140 and/or enterprise server infrastructure 160) may send, via the communication interface 113, a command to user device 130 to disable voice command functionality. Additionally or alternatively, a command to disable voice command functionality may be transmitted to user device 130 based on other unusual activity related to the user account and/or other attempts to unsuccessfully access the user account and/or if the voice command attempt(s) match voice characteristics of prior unauthorized attempts.

Subsequently, voice biometric authentication computing platform 110 may repeat one or more steps of the example event sequence discussed above in authenticating voice biometric data (e.g., audio files comprising voice commands). Additionally or alternatively, voice biometric authentication computing platform 110 may periodically update one or more voice biometric signatures or voice biometric matching algorithms as additional information is received and/or generate and send one or more alert messages, similar to the examples described above.

Figure 6:
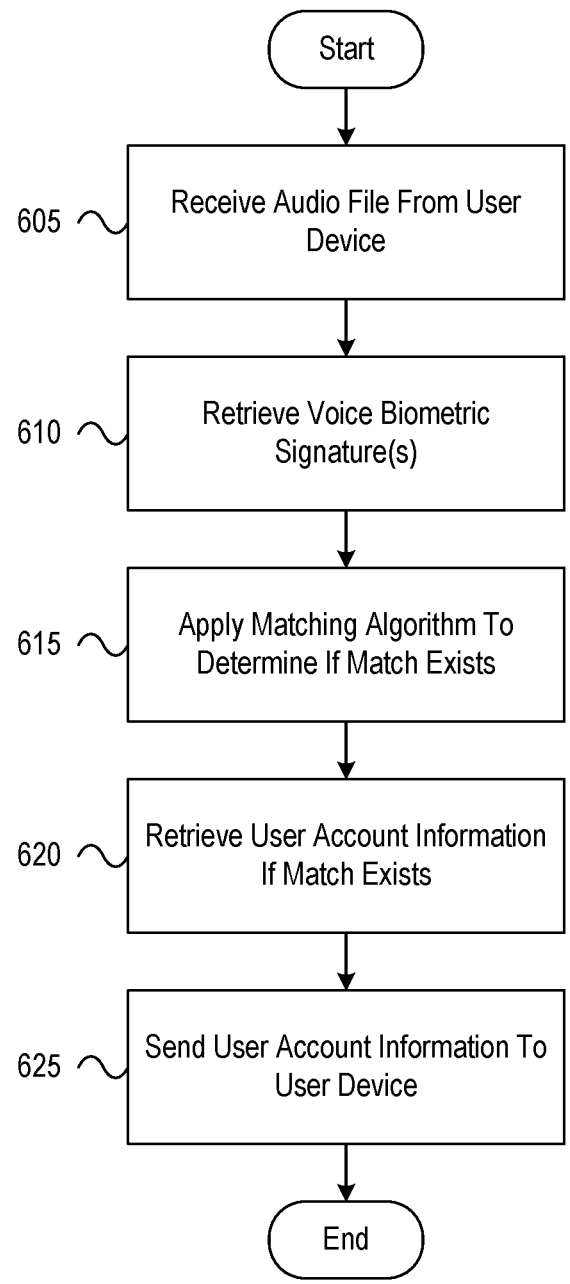
FIG. 6 depicts an illustrative method for voice biometric authentication in accordance with one or more example embodiments.

FIG. 6 depicts an illustrative method for a voice biometric authentication in accordance with one or more example embodiments. Referring to FIG. 6, at step 605, a computing platform having at least one processor, a communication interface, and memory may receive, via the communication interface, from a user device, an audio file comprising a voice command to access information related to a user account. At step 610, the computing platform may retrieve one or more voice biometric signatures from a voice biometric database associated with the user account. At step 615, based on applying a voice biometric matching algorithm to compare the voice command of the audio file to the one or more voice biometric signatures, the computing platform may determine if a match exists between the voice command and one of the one or more voice biometric signatures. At step 620, in response to determining that a match exists between the voice command and one of the one or more voice biometric signatures, the computing platform may retrieve information associated with the user account, the computing platform may retrieve information associated with the user account. At step 625, the computing platform send, via the communication interface, the information associated with the user account to the user device.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

Furthermore, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging. In addition, "set" as used in this description refers to a collection that may include one element or more than one element. Moreover, aspects of the disclosure may be implemented in non-transitory computer-readable media having instructions stored thereon that, when executed by a processor, cause the processor to perform various steps described in further detail above.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   receive, from a user device, an audio file comprising a voice command to access information related to a user account;
   apply a voice biometric matching algorithm to compare the voice command of the audio file to one or more voice biometric signatures associated with the user account to determine if a match exists between the voice command and one of the one or more voice biometric signatures;
   in response to determining a mismatch between the voice command and the one or more voice biometric signatures, generate a message to transmit to the user device, wherein the message comprises an indication that the voice command was not verified and a request for a repeat voice command; and
   in response to determining a mismatch between the voice command and the one or more voice biometric signatures, determine whether a level of background noise associated with the audio file is higher than a noise threshold,
   wherein the message to transmit to the user device is generated in response to determining that the level of background noise is higher than the noise threshold.

2. The computing platform of claim 1, wherein applying the voice biometric matching algorithm includes:
   retrieving one or more voice biometric signatures associated with the user account from a voice biometric database comprising a plurality of voice biometric signatures.

3. The computing platform of claim 1, wherein generating the message to transmit to the user device in response to determining a mismatch between the voice command and the one or more voice biometric signatures includes generating an error message to transmit to the user device relating to determining a mismatch between the voice command and the one or more voice biometric signatures, wherein the error message comprises at least one of: an audio file, a video file, an image file, or text content.

4. The computing platform of claim 1, wherein the memory stores additional computer-readable instructions that, when executed by the at least one processor, cause the computing platform to:
   responsive to the request for a repeat voice command, receive, from the user device, a second audio file comprising a second voice command to initiate a transaction related to a user account related to the user account;
   apply the voice biometric matching algorithm to compare the second voice command of the second audio file to the one or more voice biometric signatures to determine if a match exists between the second voice command and one of the one or more voice biometric signatures; and in response to determining that a match exists between the second voice command and one of the one or more voice biometric signatures, transmit a notification comprising a transaction verification to an enterprise server.

5. The computing platform of claim 1, wherein the memory stores additional computer-readable instructions that, when executed by the at least one processor, cause the computing platform to:

upon sensing that a level of background noise at the user device is lower than the noise threshold, transmit a prompt to the user device to obtain the repeat voice command.

6. The computing platform of claim 1, wherein the memory stores additional computer-readable instructions that, when executed by the at least one processor, cause the computing platform to:

in response to determining a mismatch between the voice command and the one or more voice biometric signatures, determine if a match percentage is below a match threshold; and in response to determining that the match percentage is below the match threshold, send, via the communication interface, an alert to an enterprise server, the alert comprising a notification of an unauthorized voice command attempt at the user device.

7. The computing platform of claim 1, wherein the memory stores additional computer-readable instructions that, when executed by the at least one processor, cause the computing platform to:

in response to determining that a match exists between the voice command and one of the one or more voice biometric signatures, retrieve information associated with the user account from an enterprise server, wherein retrieving information associated with the user account comprises transmitting a user identity verification to the enterprise server and retrieving the information associated with the user account from the enterprise server; and send, via the communication interface, the information associated with the user account to the user device.

8. The computing platform of claim 1, wherein the memory stores additional computer-readable instructions that, when executed by the at least one processor, cause the computing platform to:

determine if a number of voice command attempts exceeds an attempt threshold;

upon determining that the number of voice command attempts exceeds the attempt threshold, generate an alert comprising a notification of unauthorized voice command attempts at the user device; and send, via the communication interface, the alert to an enterprise server.

9. The computing platform of claim 1, wherein the memory stores additional computer-readable instructions that, when executed by the at least one processor, cause the computing platform to:

in response to determining a mismatch between the voice command and the one or more voice biometric signatures, send, via the communication interface, the message to a second user device, wherein the second user device is a user account verified device, wherein the message comprises information related to the mismatch between the voice command and the one or more voice biometric signatures.

10. The computing platform of claim 1, wherein the memory stores additional computer-readable instructions that, when executed by the at least one processor, cause the computing platform to:

in response to determining a mismatch between the voice command and the one or more voice biometric signatures, send, via the communication interface, a command to the user device to disable voice command functionality.

11. The computing platform of claim 1, wherein at least one voice biometric signature of the one or more voice biometric signatures is created by a voice biometric training computing platform based on passive voice monitoring audio data.

12. The computing platform of claim 11, wherein creating the at least one voice biometric signature by the voice biometric training computing platform based on passive voice monitoring audio data includes computing a confidence level associated with the at least one voice biometric signature.

13. The computing platform of claim 11, wherein creating the at least one voice biometric signature by the voice biometric training computing platform based on passive voice monitoring audio data includes updating an initially-created voice biometric signature based on additional received passive voice monitoring audio data.

14. The computing platform of claim 1, wherein at least one voice biometric signature of the one or more voice biometric signatures is created by a voice biometric training computing platform based on active voice monitoring data.

15. The computing platform of claim 14, wherein creating the at least one voice biometric signature by the voice biometric training computing platform based on active voice monitoring audio data includes:

sending a plurality of user voice commands to the user device;

transmitting, from the user device to the voice biometric training computing platform, audio data responsive to each of the plurality of user voice commands; and computing the at least one voice biometric signature from the audio data responsive to each of the plurality of user voice commands.

16. A method, comprising:

at a computing platform comprising at least one processor, a communication interface, and memory:

receiving, from a user device, an audio file comprising a voice command to access information related to a user account;

applying a voice biometric matching algorithm to compare the voice command of the audio file to one or more voice biometric signatures associated with the user account to determine if a match exists between the voice command and one of the one or more voice biometric signatures;

in response to determining a mismatch between the voice command and the one or more voice biometric signatures, generate a message to transmit to the user device, wherein the message comprises an indication that the voice command was not verified and a request for a repeat voice command; and in response to determining a mismatch between the voice command and the one or more voice biometric signatures, determining whether a level of background noise associated with the audio file is higher than a noise threshold, wherein the message to transmit to the user device is generated in response to determining that the level of background noise is higher than the noise threshold.

17. The method of claim 16, further comprising: in response to determining that a match exists between the voice command and the one or more voice biometric signatures, transmitting a user identity verification to an enterprise server and retrieving information associated with the user account from the enterprise server.

18. The method of claim 16, further comprising:
in response to determining a mismatch between the voice command and the one or more voice biometric signatures, sending the message to a second user device, wherein the second user device is a user account verified device, and wherein the message comprises information related to the mismatch between the voice command and the one or more voice biometric signatures.

19. One or more non-transitory computer-readable media storing instructions that, when executed by a computing platform comprising at least one processor, a communication interface, and memory, cause the computing platform to:
receive, from a user device, an audio file comprising a voice command to access information related to a user account;
apply a voice biometric matching algorithm to compare the voice command of the audio file to one or more voice biometric signatures associated with the user account to determine if a match exists between the voice command and one of the one or more voice biometric signatures;
in response to determining a mismatch between the voice command and the one or more voice biometric signatures, generate a message to transmit to the user device, wherein the message comprises an indication that the voice command was not verified;
in response to determining a mismatch between a subsequent voice command and the one or more voice biometric signatures, send, via the communication interface, an alert to an enterprise server relating to an unverified voice command attempt; and
in response to determining a mismatch between the subsequent voice command and the one or more voice biometric signatures, determine whether a level of background noise associated with the audio file is higher than a noise threshold,
wherein the message to transmit to the user device is generated in response to determining that the level of background noise is higher than the noise threshold.

\* \* \* \* \*